US 7,802,246 B1

(12) United States Patent
Kennedy et al.

(10) Patent No.: US 7,802,246 B1
(45) Date of Patent: Sep. 21, 2010

(54) SYSTEMS AND METHODS THAT FACILITATE SOFTWARE INSTALLATION CUSTOMIZATION

(75) Inventors: Kevin A. Kennedy, Kirkland, WA (US); Robert P. St. Pierre, Redmond, WA (US); Lee Dicks Clark, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1486 days.

(21) Appl. No.: 10/872,894

(22) Filed: Jun. 21, 2004

(51) Int. Cl.
*G06F 9/45* (2006.01)
(52) U.S. Cl. ...................................... 717/173
(58) Field of Classification Search ................. 717/173; 719/328
See application file for complete search history.

(56) References Cited

U.S. PATENT DOCUMENTS

| 6,237,144 | B1 | 5/2001 | Delo |
| 6,378,127 | B1 | 4/2002 | Delo |
| 6,557,169 | B1 | 4/2003 | Erpeldinger |
| 6,608,618 | B2 | 8/2003 | Shuler et al. |
| 6,704,807 | B1 * | 3/2004 | Mathur et al. ............. 719/328 |
| 6,715,144 | B2 | 3/2004 | Daynes et al. |
| 6,947,571 | B1 * | 9/2005 | Rhoads et al. ............. 382/100 |
| 7,124,400 | B2 * | 10/2006 | Mortensen et al. ......... 717/121 |
| 2003/0037327 | A1 | 2/2003 | Cicciarelli et al. |
| 2003/0093433 | A1 * | 5/2003 | Seaman et al. ............. 707/102 |
| 2004/0181773 | A1 * | 9/2004 | Mortensen et al. ......... 717/101 |
| 2005/0108218 | A1 * | 5/2005 | Mathur et al. ............... 707/3 |

OTHER PUBLICATIONS

Gul Agha, et al., A Linguistic Framework for Dynamic Composition of Dependability Protocols, Proceedings of the IFIP Conference on Dependable Computing for Critical Applications, 1993, pp. 1-15.

* cited by examiner

*Primary Examiner*—John Chavis
(74) *Attorney, Agent, or Firm*—Woodcock Washburn LLP

(57) ABSTRACT

The present invention facilitates customizing software installation such as software updates for a user interface (UI) of a mobile communication device. The systems and methods of the present invention utilize a component that receives software updates (e.g., releases, releases, patches, upgrades, etc.) and presents various installation options to an installer through an interface. The installer can interact with the interface to select one or more components (e.g., controls, menus, menu items, etc) to install and define how such components are installed. For example, the installer can determine a control's location with respect to other controls within a user interface. This can be achieved by moving graphical components within the user interface and/or by providing parameters, setting flags, and/or including suitable arguments. In addition, the installer can add components to an installation. For example, the installer can add proprietary and/or third party applications, features, brands, logos and aesthetics to the installation.

29 Claims, 20 Drawing Sheets

CALL PROGRESS CONTROLS FOR
AN EXEMPLARY SMARTPHONE OR
MOBILE PHONE

CALL PROGRESS CONTROLS FOR
AN EXEMPLARY POCKET PC

DIAL PAD CONTROLS FOR AN
EXEMPLARY POCKET PC

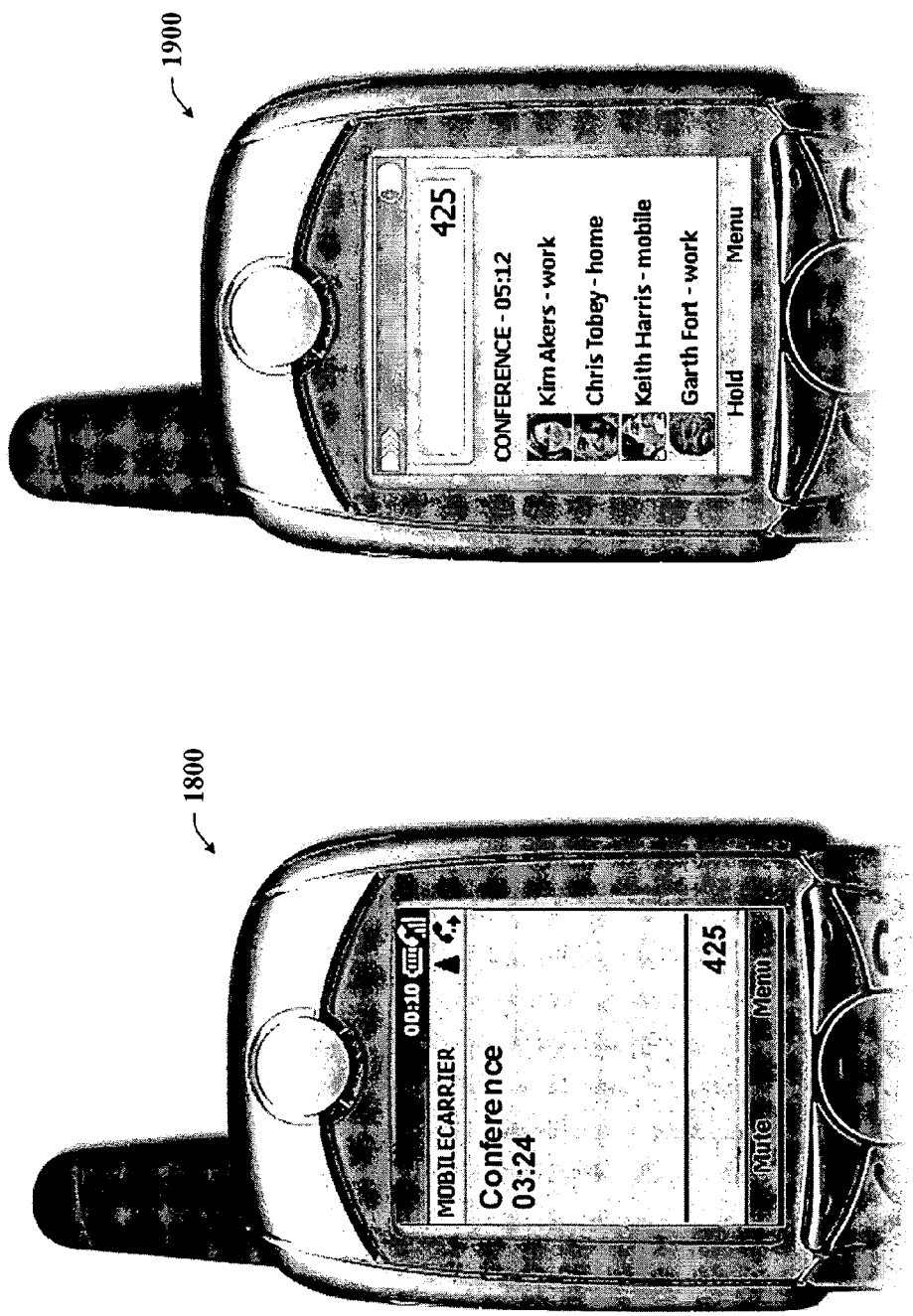

SYSTEMS AND METHODS THAT FACILITATE SOFTWARE INSTALLATION CUSTOMIZATION

TECHNICAL FIELD

The present invention generally relates to software and, in particular, to customizing a user interface during an installation of software updates through selecting, moving and adding software components in a graphical representation of the software.

BACKGROUND OF THE INVENTION

User Interfaces (UIs) are commonly employed in connection with microprocessor-based devices to enhance a user's ability to view information (e.g., text, options, controls, etc.) and to provide the user with a mechanism to interact (e.g., invoke functionality) with a device wherein the underlying UI code is executing. By way of example, many personal computers today employ operating systems that deploy a UI when booting-up. Depending on system configuration, this UI can provide system configuration information such as power management settings, boot sequence, hardware configuration options, control of a system clock, manual mode selection, etc. In other instances, the UI can provide a framework in which applications can be executed. Commonly, invocation of an application elicits the creation of anther UI(s) (e.g., a UI that executes within or over the main UI).

For example, a word processor application can be launched from within a UI (e.g., via an icon or menu item), wherein a word processing UI is deployed. The user can utilize this UI to create documents (e.g., via voice recognition features, a mouse and a keyboard), format text and paragraphs therein, email the document to others, save the document to memory, etc. In many instances, even environments that traditionally leverage command line activity utilize a general UI as a framework wherein the command UI can be created to provide a user with command line functionality within a command UI. The foregoing represents an evolution in paradigms (from command line to UI-based applications) in the programming domain.

Recent advances in hardware and software have led to increased research and development with custom operating systems that can be employed with devices such as mobile phones, personal data assistants, calculators, watches, etc. to provide control, applications, flexibility and aesthetics through user interfaces similar to that provided in a conventional desktop computer. By utilizing scaled down (e.g., due to memory constraints in such devices) and application specific (e.g., phone features, time features, etc.) operating systems, these devices essentially become mini-computers. In many instances, a manufacturer of such devices or a service provider that provides the environment for the devices can define the information displayed on a device to an end user. This ability to customize the user interface enables the manufacturer and service provider to personalize the device with a "look" and "feel" associated with the manufacturer or service provider (e.g., a logo) based on available functionality to distinguish its product from competitors' products.

Conventionally, operating system software for a particular device (e.g., a mobile phone) is generated by a third party and is generic to the manufacturer and service provider in that the software mainly provides the framework in which applications can be executed and not manufacturer or service provider specific visuals. Thus, with conventional systems, manufacturers and service providers often expend considerable time and resources to re-write code or include additional routines that personalize customer user interfaces to the manufacturers and service providers. However, in many instances when software updates are installed, the manufacturers' and service providers' customization or personalization is lost. For example, installing the software update can write over portions of code that display a company logo. For example, the location where the customized configuration is stored can be written over by a default configuration, not linked to the newly installed software or deemed incompatible.

Thus, manufacturers and service providers commonly have to re-customize (e.g., through writing new code or modifying existing code) customer user interfaces after an installation of a software update. This effort can be exacerbated by the rapid evolution of programming languages and software, wherein frequent software updates can include syntax unfamiliar to the manufacturer or service provider or written in a developing program language unfamiliar to the manufacturer or service provider.

SUMMARY OF THE INVENTION

The following presents a simplified summary of the present invention in order to provide a basic understanding of various aspects of the subject invention. This summary is not an extensive overview of the invention. It is not intended to identify key/critical elements of the invention or to delineate the scope of the invention. Its sole purpose is to present some concepts of the invention in a simplified form as a prelude to the detailed description that is presented later.

The present invention provides systems and methods that facilitate customizing an installation of software over previously installed software in a device in order to maintain, at least in part, customization associated with the previously installed software. The systems and methods utilize a novel approach that can provide improvements over traditional techniques that write over previously installed software such that any or all customization associated with the previously installed software is not retained. In general, the systems and methods of the present invention comprise components that receive software updates (e.g., releases, releases, patches, upgrades, etc.) and, during installation of the software updates, facilitate presenting (e.g., graphically) various installation options to a software installer associated with an operator, a manufacturer, a supplier, a distributor, an advertiser, a sponsor, etc. (hereafter a manufacturer or service provider) of the device. For example, the components can present various graphical user interfaces (GUIs) through an Application Programming Interface (API) to the installer, wherein the installer can determine which interfaces to install and the layout of buttons, icons, controls, menus, menu items, color schemes, text, audio tones, etc. for respective customer user interfaces.

In addition, the components provide the installer with an ability to retain one or more attributes associated with the previously installed software. For example, the installer can port existing software from the previous installation to the current installation. In another example, the installer can add proprietary and/or third party software components that are additionally installed during the installation. The foregoing can mitigate complete loss of previous software customization and re-customization efforts, which typically are tedious and consume resources that could be more efficiently utilized elsewhere. An example of customization that can be advantageous to include with the new installation includes a manufacturer or service provider brand name or logo. Thus, the installer can retain, change or remove indicia unique to the manufacturer or service provider during software installation. It is to be appreciated that the novel systems and methods can be employed in connection with microprocessor-based devices such as computers (e.g., desktop, mobile, pocket PCs, etc.), communication devices (e.g., videophones, mobile phones, smartphones, etc.), and the like.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIGS. 13-21 illustrate various views of exemplary UIs in connection with several aspects of the present invention.

DETAILED DESCRIPTION OF THE INVENTION

Figure 1:
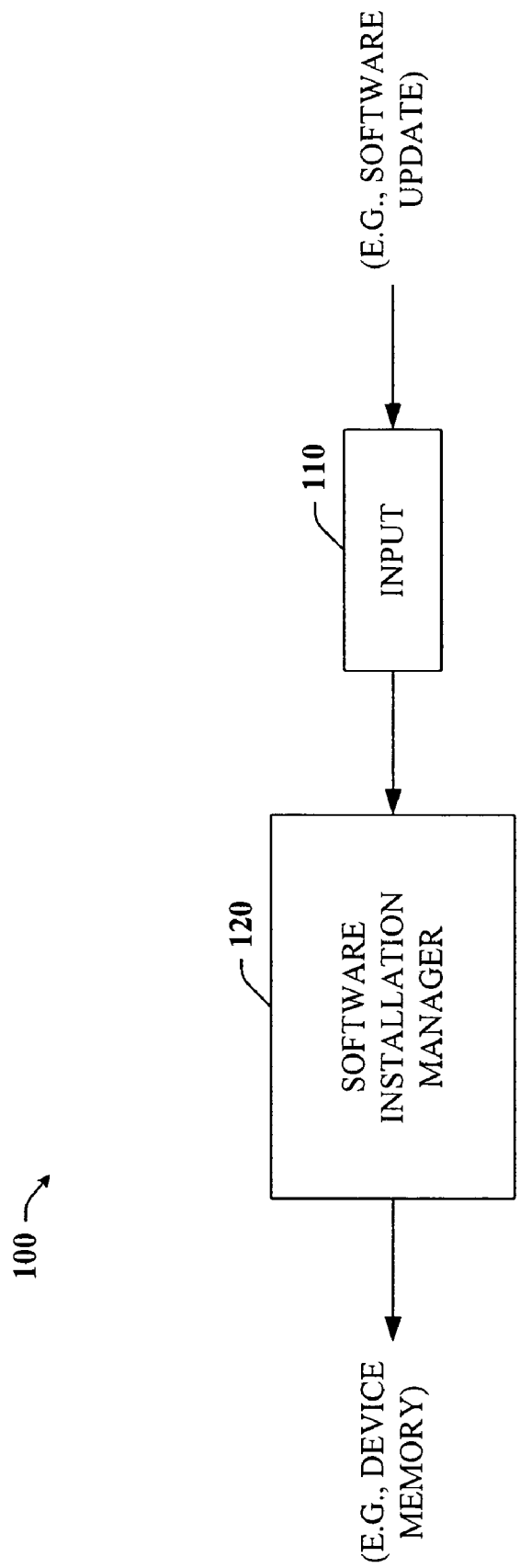
FIG. 1 illustrates an exemplary system that facilitates customization of an installation of one or more software updates.

The present invention relates to novel software installation approaches that can be utilized to retain and/or modify a customer user interface customization scheme when installing software updates and additional components. The systems and methods of the present invention provide one or more components (e.g., interfaces and an installation manager) that software installers can interact with to select software components to install from software updates, add proprietary and/or third party software to the installation, customize the installation thereof, and facilitate installation of the customized software.

As utilized in this application, the terms "component," "system," "interface," "manager," and the like are intended to refer to a computer-related entities, including hardware, firmware or software, a combination thereof, and/or executing software. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be local to one computer and/or distributed between two or more computers.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that facilitates software installation customization. The system 100 comprises an input component 110 and a software installation manager 120. The input component 110 can receive software updates, as well as other information, from an installation on essentially any microprocessor-based device. Such updates and information can be related to one or more operating systems, programs, applications, firmware, etc. executing on the device. In addition, the software updates and/or the other information can be provided in various formats. For example, a markup language such as XML and HTML, a C-based language such as C++ and C#, and/or Visual basic can be utilized to generate and/or package software updates and information. In addition, software updates and information can be provided as binary files, ASCII files, object files, etc.

The input component 110 can convey software updates to the software installation manager 120 or store the updates for later retrieval by the software installation manager 120. For example, the input component 110 can write software updates, which can be encompassed in an individual file(s), a compressed file(s), an encoded file(s), and/or encrypted file(s), to local and/or remote memory (e.g., volatile and non-volatile). The software installation manager 120 can retrieve or request one or more stored software updates when invoked by an installer, for example, when the installer activates an installation utility such as an install shield.

The software installation manager 120, alone or in conjunction with another installation utility, can facilitate installation of one or more software updates. In one instance, the software installation manager 120 can interact with an installer, wherein the installer can determine which software updates (e.g., components such as controls, interfaces, functionality, modules, etc.) to install or not install, define how to install such updates (e.g., define a layout, look, feel, color scheme, etc.), whether to remove any previously installed components, and/or indicate which previously installed components and customization to retain or port, for example. In another instance, the software installation manager 120 can link components (e.g., proprietary and third party) provided by the installer with one or more software updates in order to concurrently install such components with the software updates or install these components after installation of the software updates.

In yet another instance, software updates can be compared with currently installed software or a saved copy of the installation file(s) associated with the current software installation. The comparison can be utilized to generate difference indicia to determine whether the currently installed software is a default or custom version. Where resulting indicia indicates a custom version, customization can automatically and/or on demand be ported and included in the new installation. Where the resulting indicia indicates a default version is currently employed, the installer can be prompted whether to select either a default or a custom installation. In still another aspect of the invention, intelligence can be utilized to facilitate installation. For example, a history of previous installations, customizations and user actions, use characteristics, probabilities, statistics, inference, classifiers and/or various other machine learning based techniques can be utilized to automatically customize an installation or provide the installer with an initial configuration of an installation. The installer can proceed with this configuration or override any set-up options (e.g., utilize the default, a predefined or other installation configuration) therein.

The software installation manager 120 can install software updates based on the installer's customization, which, as noted above, can include proprietary and/or third party software components. In one aspect of the invention, the software installation manager 120 installs the customized software update to various regions of memory. In other aspects of the invention, the software installation manager 120 provides the customized software update to another component for further customization or installation. In yet other aspects of the invention, the software installation manager 120 installs at least a portion of the customized software update and at least one other component (not shown) installs remaining portions of the customized software update.

Communication amongst the software installation manager 120, the input component 110, and entities providing software updates can be through essentially any communication topology, protocol and/or medium. For example, wireless technologies such as radio frequency (RF), infrared (IR), optics, Wi-Fi, Blue-Tooth, etc. can be employed in accordance with aspects of the present invention. In another example, hard wired technologies such as Ethernet (e.g., 10Base-T, 100Base-T (Fast Ethernet) and 1000Base-T (Gigabit Ethernet), Universal Serial Bus (USB), FireWire, traditional communication ports (e.g., serial and parallel), etc. can be employed. Such wire-based technologies generally utilize standard transmission mediums such as UTP CAT-5, RG6, RG59, etc. In still other aspects, various combinations of the foregoing technologies can be employed. For example, software updates can be transmitted via RF to an intermediary component that communicates with a device through a USB port. In another example, RF can be utilized to transmit software updates to an intermediary component that can communicate with a device through an Ethernet port.

It is to be appreciated that the system 100 can be employed with essentially any microprocessor-based device. Examples of suitable microprocessor-based device include desktop computers, laptops, workstations, mainframes, personal data assistants, mobile phones, etc. In addition, the system 100 can be utilized when updating system level software, including user interfaces that are provided to the end user of a device.

Thus, the installer can retain, change or remove one or more user interface attributes associated with a manufacturer, a supplier, a distributor, an advertiser, an operator, a sponsor, etc. during software installation. Such attributes can include controls, dialog layout, visuals, branding, icons, menus, menu items, text, skins, logos, brands, etc.

Figure 2:
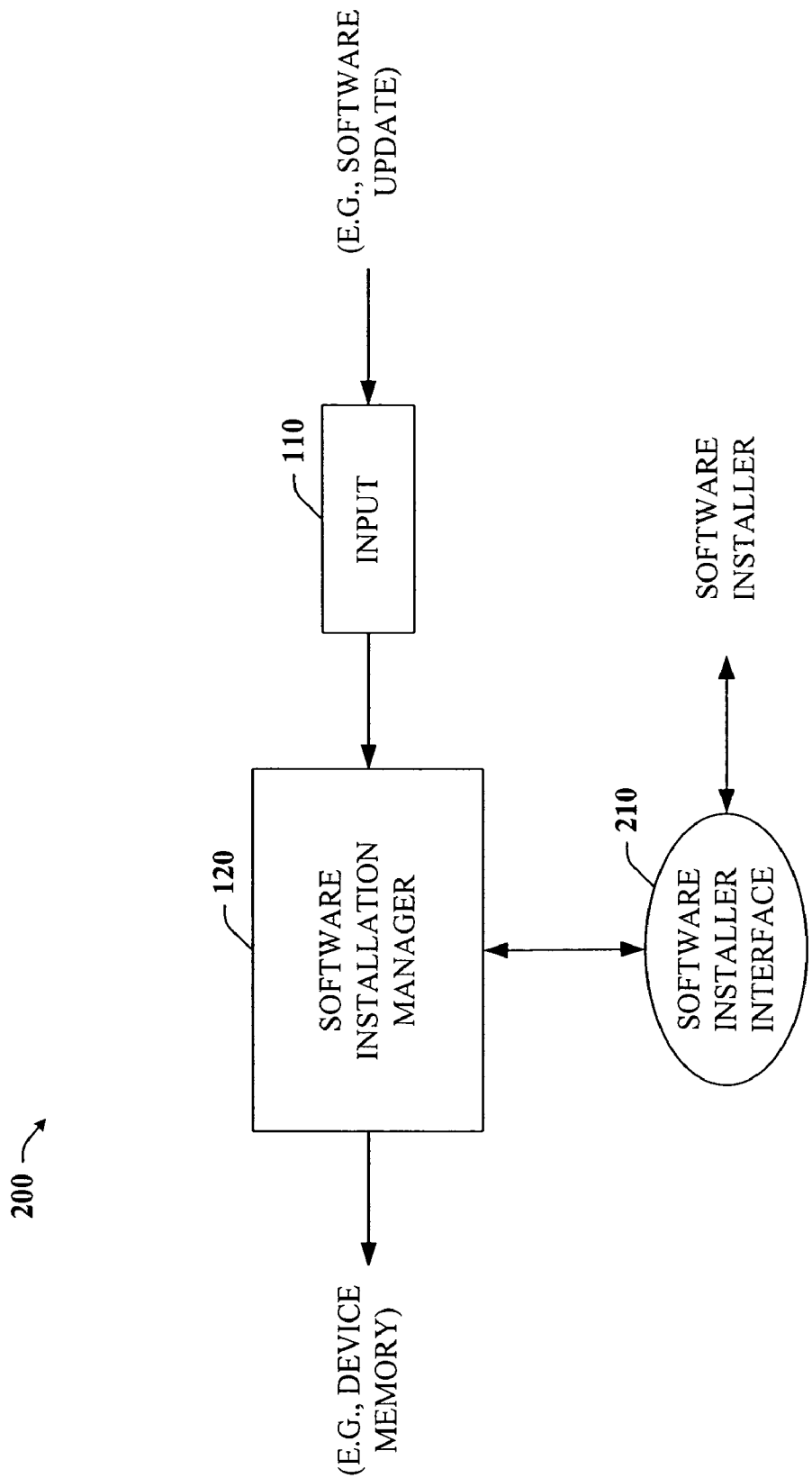
FIG. 2 illustrates an exemplary system that employs an interface to facilitate software installation customization.

FIG. 2 illustrates a system 200 that comprises the input component 110, the software installation manager 120, and a software installer interface 210. The software installer interface 210 can provide a mechanism for interaction between the software installation manager 120 and an installer. As noted above, such interaction can be related to selecting, positioning and/or altering controls, dialog layouts, visuals, text formatting, icons, menus, menu items, etc. and adding components during installation of software updates, and such software updates can be associated with an operating system(s), user interface(s), etc. Thus, the installer can utilize the software installer interface 210 to preview default software update configuration, remove components from the software update, add components to the software update, re-layout various components of the software update, etc.

The software installer interface 210 can be provided by a supplier (e.g., an owner, a developer, etc.) of the software update. For example, the supplier can provide the software installer interface 210 to facilitate installation of its software update. Thus, the software installer can be relieved from having to write device drivers and/or interfaces in order to interact and/or customize the installation of the software update. In other instances, the software installer interface 210 can be a proprietary interface generated by the installer of the software. Thus, a proprietary interface can be created by an operator, a manufacturer, a retailer, a wholesaler, a service provider, etc., if desired. It is to be appreciated that multiple software installer interfaces 210 can be concurrently and/or serially utilized in accordance with aspects of the invention.

The software installer interface 210 can be a graphical user interface (GUI) and/or a command line user interface and can be referred to as an Application Programming Interface (API). In general, a GUI can provide the installer with a region and/or means to alter and/or manipulate graphical objects (e.g., icons, structures, text boxes, etc.) in connection with end-user applications and/or user interfaces. In addition, input regions can be provided for entry of parameters, arguments, etc. that can be utilized to effectuate such objects. Moreover, one or more presentation regions can be provided to dynamically present interfaces to the installer to provide a preview of any alteration, manipulation and/or change. The GUI can include basic text and/or graphic regions that incorporate dialogue boxes, static controls, drop-down-menus, list boxes, pop-up menus, edit controls, combo boxes, radio buttons, check boxes, push buttons, and graphic boxes, for example. In addition, utilities such as vertical and/or horizontal scroll bars that facilitate navigation and toolbar buttons to determine whether a region will be viewable, hidden, minimized, etc. can be employed.

The software installer user can interact with at least the aforementioned regions to select and provide information via various devices such as a mouse, a roller ball, a keypad, a keyboard, a pen and/or voice activation, for example. Typically, a mechanism such as a push button or an enter key on the keyboard/keypad can be employed subsequent to entering textual and/or voice information in order to invoke a response. However, it is to be appreciated that the invention is not so limited. For example, merely highlighting a check box can elicit an action.

In another example, a command line user interface can be employed to prompt (e.g., via a text message on a display and an audio tone) the installer to perform an action or provide information via alpha-numeric input corresponding to an option provided in the prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

As briefly noted above, in various aspects of the present invention the software installer can include proprietary and/or third party controls, color schemes, fonts, skins, menus, menu items, graphics, tools, etc. with the installation of the software update and/or whenever desired. This can be accomplished via the software installer interface 210. Thus, the installer can add components, brandings, logos, applications, etc. to distinguish its product from other similar products. In addition, the software installer can utilize the software installer interface 210 to seamlessly work within other environments such code generating/debugging environments, various editors, web browser, etc.

Figure 3:
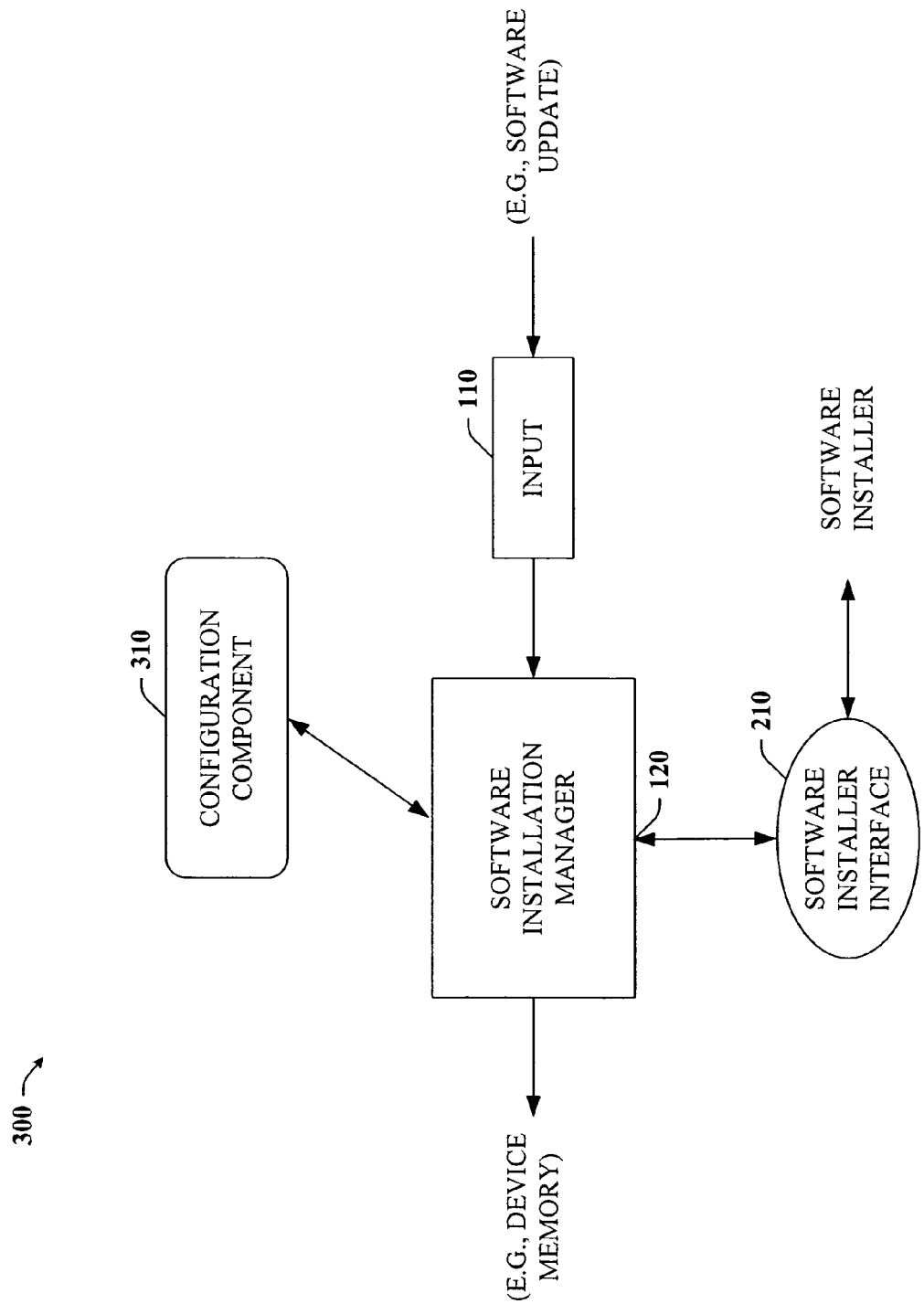
FIG. 3 illustrates an exemplary system that utilizes a configuration during customization of a software update installation.

FIG. 3 illustrates a system 300 that comprises the input component 110, the software installation manager 120, the software installer interface 210, and a configuration component 310. As described in detail above, the input component 110 can receive software updates and convey the updates to the software installation manager 120, wherein the software installation manager 120 can facilitate customizing the software update to maintain current customization and/or change customization by enabling a software installer with the capability to select, position and/or alter controls, dialog layouts, visuals, text formatting, icons, menus, menu items, brand names, logos, etc. through the software interface component 210 during installation of the software updates.

The software configuration component 310 can facilitate software installation by separating and/or grouping software components of the software update. For example, the software update can include updates to various aspects of the software. For example, one or more portions of the software update can be related to a user interface provided to an end user or customer. This user interface can present information and allow the end user to operate a device. One or more other portions of the software update can be related to low level system updates or security related features. Accordingly, the software configuration component 310 can facilitate parsing the software update based on these or other groupings. Such parsing can include physical parsing, wherein appropriate, and virtual parsing through tags or other indicia, for example. Respective groupings can be presented to the software installer in separate sections that are customized independently or concurrently as an aggregated group.

Figure 4:
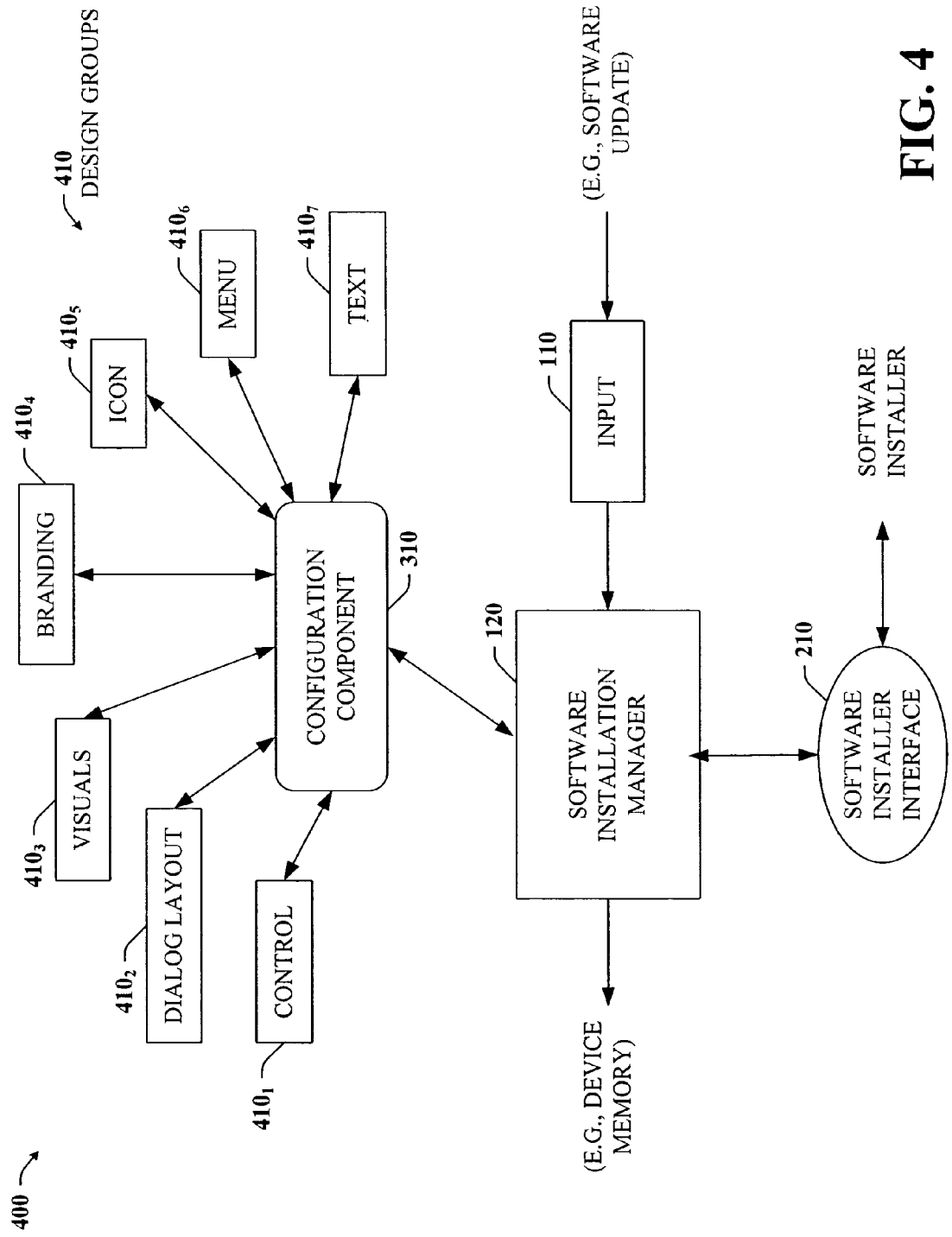
FIG. 4 illustrates an exemplary system that employs a plurality of design components in connection with installation customization.

FIG. 4 illustrates a system 400 that comprises the input component 110, the software installation manager 120, the software installer interface 210, the configuration component 310, and a plurality of design components 410. The design components 410 facilitate further delineation and utilization of a software update. For example, the system 400 can include a control design group $410_1$, a dialog layout design group $410_2$, a visuals design group $410_3$, a branding design group $410_4$, an icon design group $410_5$, a menu items design group $410_6$, and a text design group $410_7$. It is to be appreciated that this sample of design groups is neither exhaustive nor limiting. Thus, other design groups can be employed in accordance with as aspect of the present invention and/or one or more of the depicted design groups 410 can be absent.

In general, the control design group $410_1$ can provide various controls that can be included in the software update installation. For example, the installer can determine to tag a control that dials telephone numbers and/or associated documentation for installation. The dialog layout design group $410_2$ can provide information related control placement. For example, the information defines a default location for the dial telephone number control and specify acceptable and not locations for re-layout by the software update installer. The visuals design group $410_3$ can facilitate applying various backgrounds, foregrounds, effects (e.g., blinking, outline, etc.), patterns, templates, text formatting, etc. The branding design group $410_4$ can provide techniques for adding, changing and retaining a brand. The icon design group $410_5$ can include data related adding, changing and retaining icons. The menu items design group $410_6$ facilitates adding and removing menu items from a menu. The text design group $410_7$ includes instructions for changing menu, softkey and button indicia.

Figure 5:
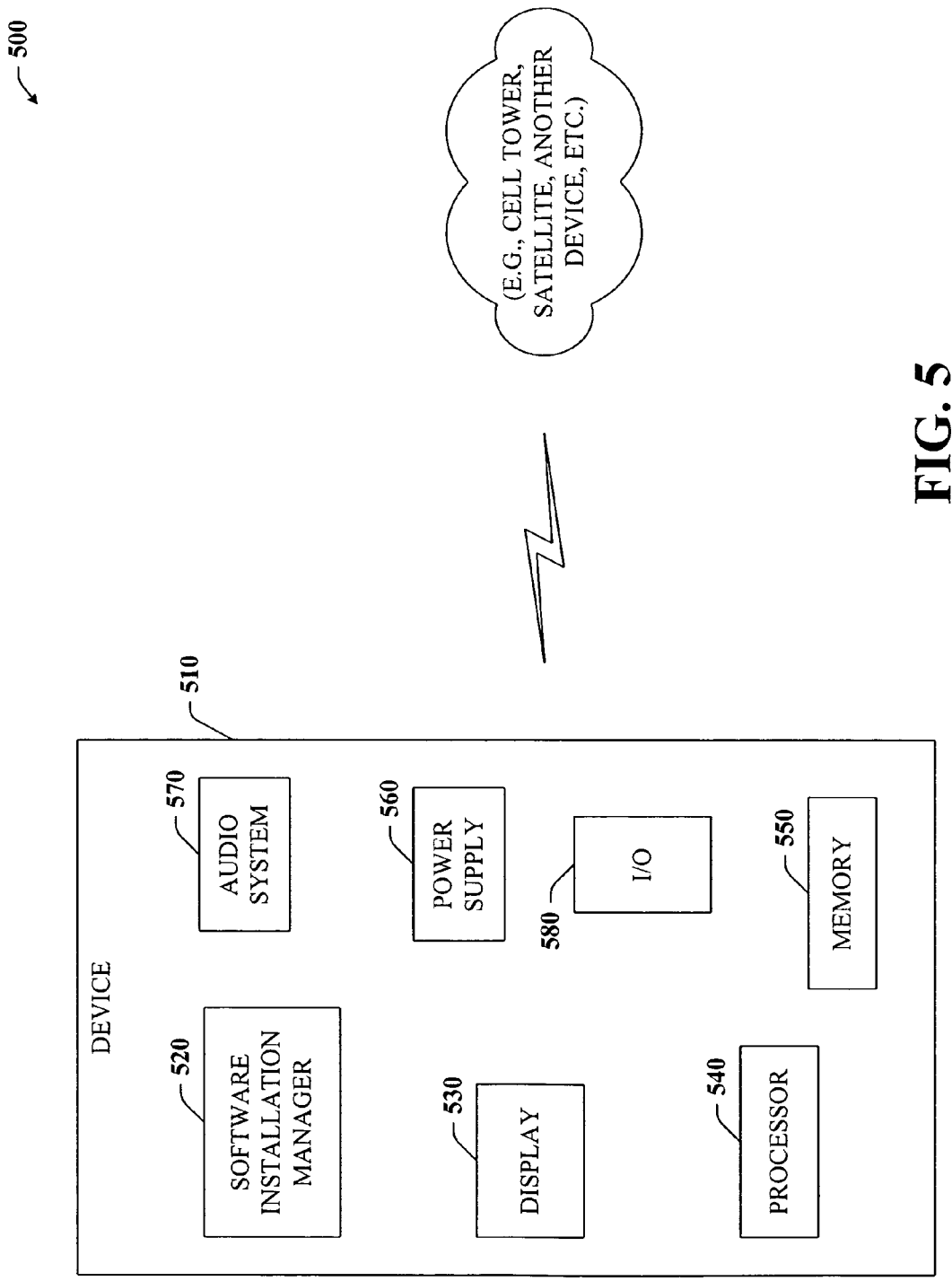
FIG. 5 illustrates an exemplary installation system that communicates with various entities that provide software updates.

FIG. 5 illustrates a system 500 that comprises a device 510 that communicates with various entities that provide software updates. The device 510 comprises a software installation manager 520, a display 530, a processor 540, memory 550, a power supply 560, an audio system 570, and an input/output (I/O) component 580.

The software installation manager 520 can facilitate retention of customization and/or further customization of an installation update. As described above, the software installation manager 510 can be employed in connection with one or more user interfaces (e.g., APIs) to customize a customer user interface that can be provided to an end user through the display component 530. For example, the software installation manager 520 can be utilized by a software installer to select controls, menus, menu items, icons, text formats, branding, dialogue layout, visuals, etc. to include in the installation of a software update. Such features can be presented to the installer through the display 530. For example, default user interfaces can be graphically displayed within the display 530, wherein the installer can interact with and/or alter the user interface by selecting and/or deselecting components to install, customizing the installation of components to install, and moving components to various locations within the user interface.

Selected components can be installed as specified through a default configuration or customized to provide a particular "look" and "feel." For example, a fictitious company "A" can customize the installation to retain, include and/or modify a company logo that appears on an end-user interface. The foregoing feature mitigates any need for post-installation software modifications to re-customize the "look" and "feel." It is to be appreciated that the display 530 can be color (e.g., 16-bit, 24-bit, etc.), grey scale (e.g., 8-bit) or monochrome (e.g., 2-bit), based on liquid crystal, CRT, LCD, LED or flat panel technology, and employed concurrently with touch audio sensitive (e.g., alpha-numeric pad) and audio (e.g., voice activation and control) regions.

The processor 540 (e.g., a microprocessor, CPU, digital signal processor (DSP), etc.) can be utilized to control and/or coordinate processing within the device 510 or provide specialized processing, for example, for software installation, acceleration of graphics, dedicated debugging and/or compiling, editing, etc. The processor 540, as well as other components, can utilize the memory 550 to store information, installed files, temporary files, custom configuration, etc. The memory 550 can be essentially any type of memory. For example, the memory can be volatile or non-volatile, write-once, erasable, re-writable, cache, Random Access Memory (RAM) and variations thereof, magnetic memory, disk memory, hardware and/or software registers, etc. The power supply 560 can include wall power or battery power. At least a portion of such battery power can be utilized while the device 510 is ambulatory for normal operation. Other portions of battery power can be utilized to maintain a system clock, basic input/output (BIOS), installer user interface customization, etc. Wall power can be utilized to charge or re-charge the battery. In addition, wall power can be utilized in lieu of the battery when the device 510 is stationary in order to extend battery life.

The audio system 570 can be utilized in place of and/or in addition to hard and soft controls. For example, an end user can leverage executing voice recognition software to communicate with the device 510. For example, where the device 510 is a mobile phone, the end user can utilize the audio system 570 to dial a phone number. In another example, the installer can utilize the audio system 570 during user interface set-up to affect controls, menus, menu items, etc. by issuing a voice command such as "install call forwarding," which can include installing a "call forward on/off" graphic within the end-user user interface.

The I/O component 580 can be utilized to transfer information to and from the device 510. In one aspect of the invention, this information can include software updates and other information as described herein. Such data can be transmitted by entities such as other similar and/or disparate devices, a cell tower (e.g., PCS, Cellular, etc.), an antenna, and a satellite, for example. In addition or alternatively, the data can be conveyed to the device 510 via CD, DVD, Floppy disk, magnetic tape, optical disk, etc. As noted previously, software updates and other information can be encapsulated within a compressed, encoded, and/or encrypted file.

Figure 6:
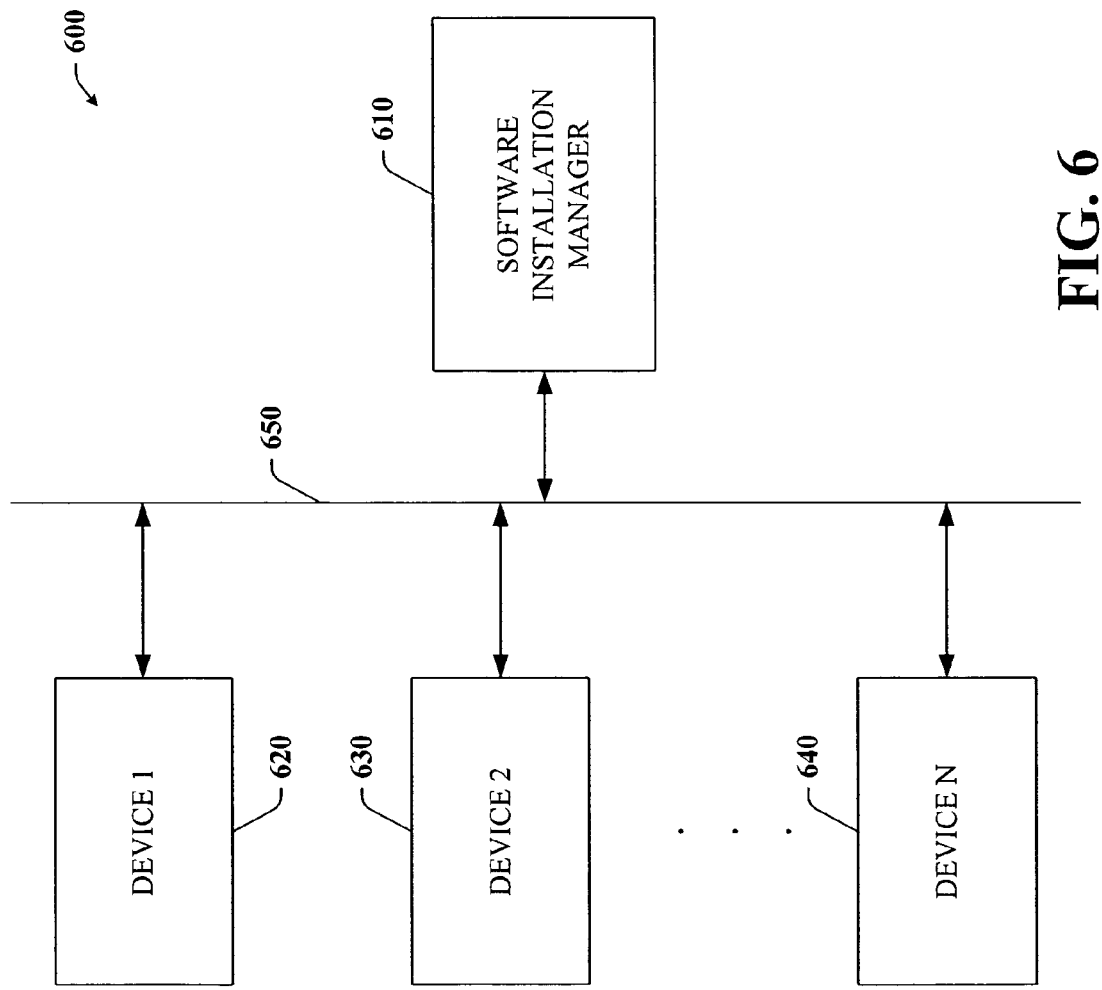
FIG. 6 illustrates an exemplary system wherein a software installation utility is utilized to facilitate software installation of software updates for a plurality of devices.

FIG. 6 illustrates a system 600 wherein a software installation component manager 610 is utilized to facilitate software installation of software updates for a plurality of devices 620-640 via a bus/network 650. Suitable devices include mobile (e.g., PCS, Cellular, etc.) phones, smartphones, pocket PCs, laptops, personal data assistants, video phones, voice-over IP (VOIP) devices, etc. The system 600 includes the software installation manager 610 that facilitates configuring user interface customization during installation of software updates as described in detail above. The software installation manager 610 can concurrently and serially install one or more software updates to one or more of devices 620-640.

It is to be appreciated that each of the devices 620-640 can be associated with a different installer that desires a different customization (e.g., brand). In addition, software updates can correspond to disparate software releases (e.g., beta, release 1, etc.), revisions, patches, fixes, enhancements, add-ons, plug-ins, etc. For example, one of the devices 620-640 can be associated with an engineering environment and employ software that provides debuggers, multi-threaded execution, ability to define process as "real-time," etc. A second device from the devices 620-640 can be associated with a home computer. The user of a home computer typically does not require the processing capabilities of a developer; thus, the needs of an end user of one of the devices 620-640 can be substantially different. The software installation component 610 can employ intelligence that facilitates determining which software updates are suitable for which device. In other aspects of the invention, the installer simply specifies such information.

Figure 7:
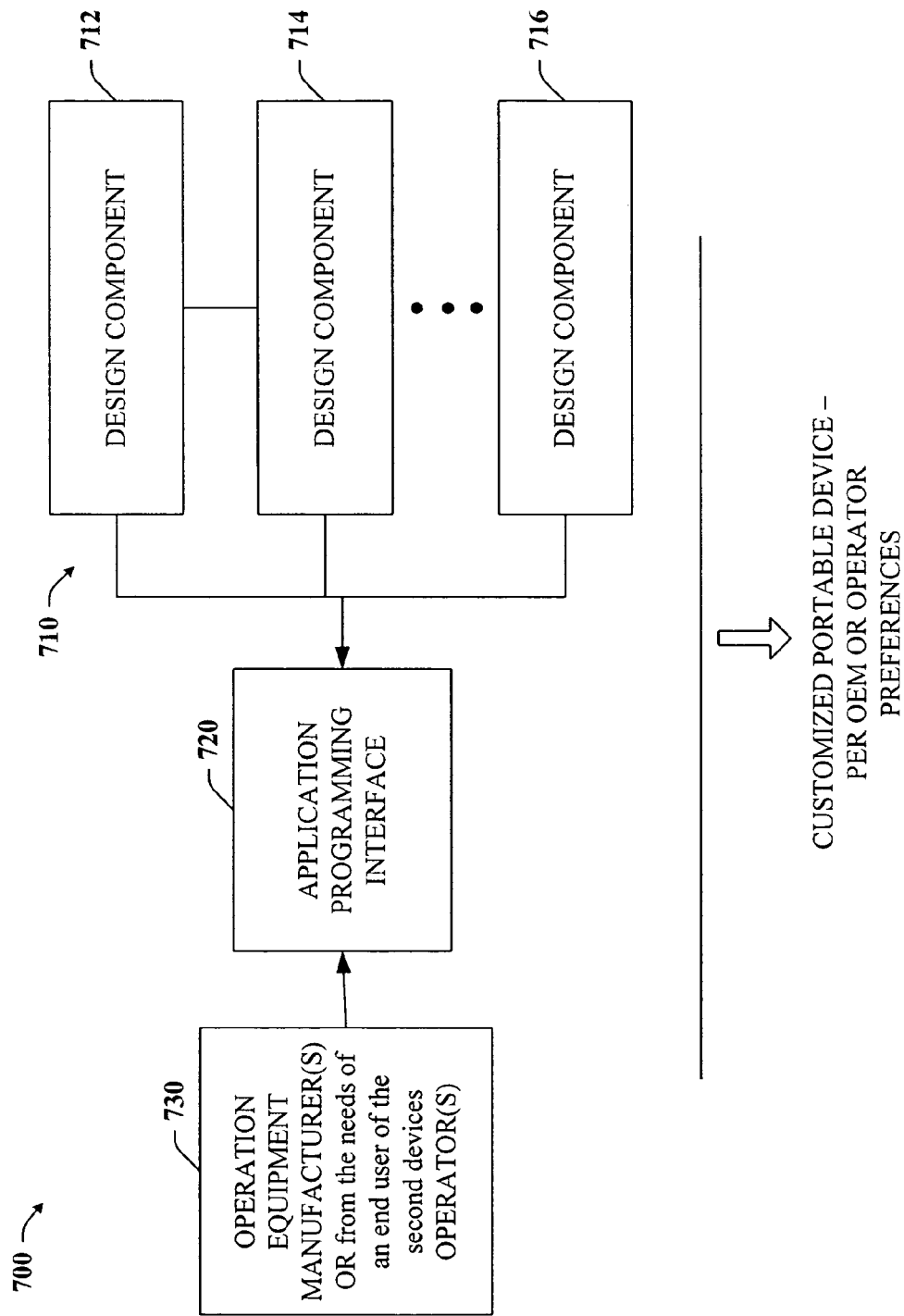
FIG. 7 illustrates an exemplary system that facilitates customization of a user interface of a portable communication device.

FIG. 7 illustrates a system 700 that facilitates customization of a user interface of a portable communication device. The system 700 comprises a plurality of customizable design components 710 (e.g., Design Component 712, Design Component 714, Design Component 716). The plurality of customizable design components 710 can include various controls for font, color, color scheme, icon type, icon placement, branding elements, background, and/or text. The system 700 further includes at least one Application Programming Interface (API) 720 that exposes the design components 710 to one or more OEMs 730 (e.g., operators and service providers). Respective OEMs 730 can have different functionality and/or layout preferences and be associated with a particular API 720. By employing the API 720, an OEM from the OEMs 730 can access one or more of the design components 710 and customize any of the desired design component 710 according to preferences. For example, one of the OEMs 730 can change a layout of status indicators and/or icons on a UI of an associated mobile phone. Thus, rather than having to alter or rewrite UI code, the OEM can employ the API to facilitate moving various components around on the UI.

Similarly, a mobile phone service provider can add a GPS (global positioning system) feature as a service. For example, the service provider can direct its OEM to implement or add this feature to the UI of its phone. Similarly, the API can enable the installer to include GPS control without substantially rewriting code. Rather, a new icon for the GPS feature can be added to the UI and the related software or application can be installed as well. Though not depicted in the FIG. 7, look up tables can also be employed to facilitate design component selection. For example, an OEM can refer to a lookup table for the available customizable design components and choose amongst them. Such desired features can then be added to the architecture as well as to other UIs of the device. As an example, a "push to talk" feature can be provided by some providers, but not through others for various reasons. However, this feature can be added to a UI of a device by an OEM or service provider when the service becomes available without requiring substantial changes to code or other programs associated with phone applications already on the device.

Figure 8:
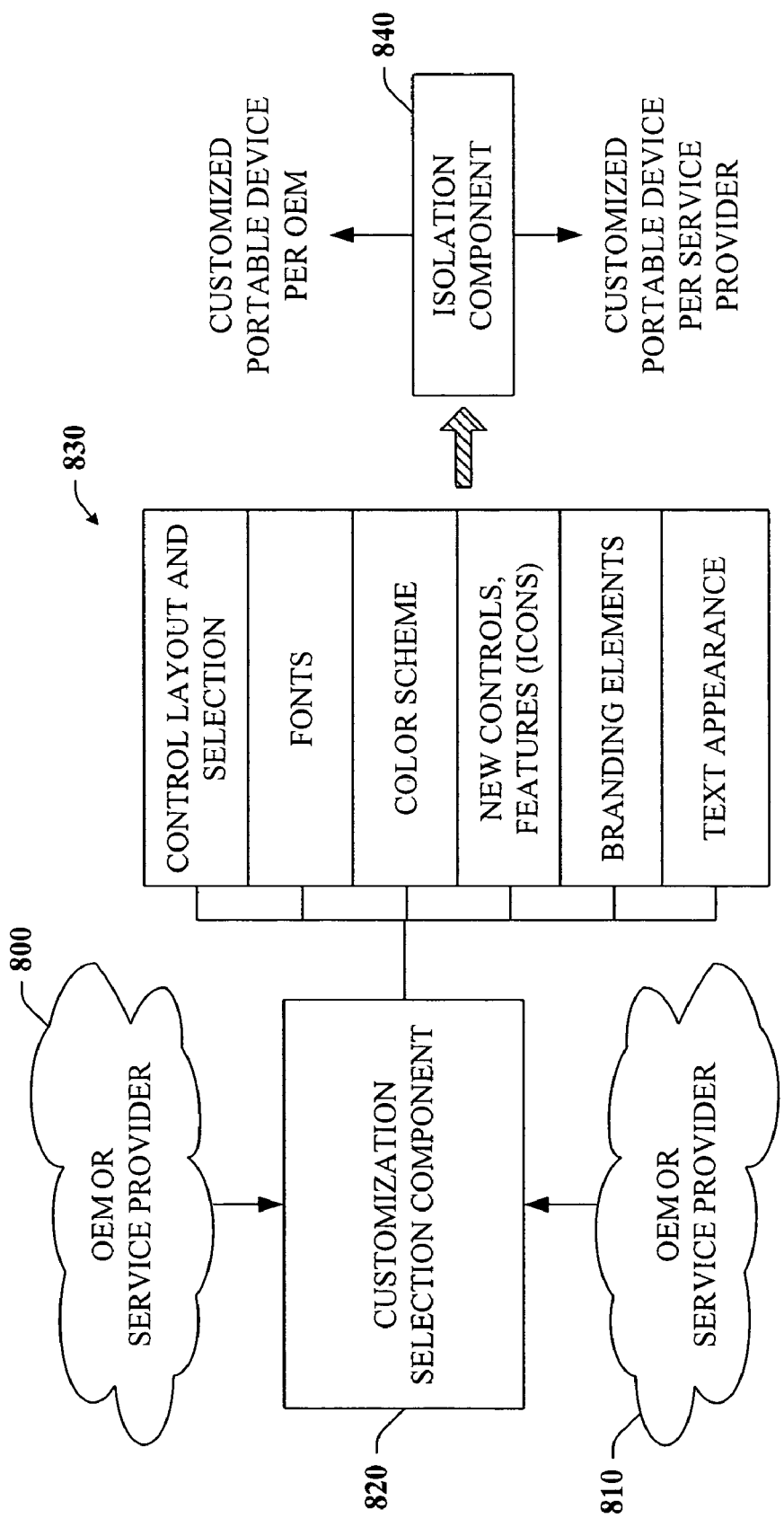
FIG. 8 illustrates exemplary OEM interaction with a plurality of design components that correspond to various areas of a user interface.

FIG. 8 illustrates OEM interaction with a plurality of design components that corresponds to various areas of a user interface. In particular, one or more OEMs (e.g., OEM or service provider 800 and/or up to OEM or service provider 810) can select one more features or controls 830 to customize by way of a customization selection component 820. Examples of suitable controls 830 include control layout and selection, fonts, color scheme (or color), new controls/features, branding elements, and/or text appearance. Upon selection, desired customizable components are funneled through an isolation component 840 that can mask design selection information from other OEMs or service providers. Thus, multiple OEMs can variously leverage the same superset of customizable design components without compromising other OEMs or service providers who customize their UIs in a similar or different manner. For example, a first OEM for competitor "A" can select from the same set of design components that are also available for selection by a second OEM supplying competitor "B." Thus, respective OEMs or service providers can select customization and overall appearance that is retained until a requested change is received.

FIGS. 9-12 illustrate various methodologies in accordance with the subject invention. The methodologies are described via a series of acts; however, it is to be understood and appreciated that the present invention is not limited by the order of acts, as some acts can, in accordance with the present invention, occur in a different order and/or concurrently with other acts not shown or described herein. In addition, those skilled in the art will understand and appreciate that the methodologies can alternatively be represented as a series of interrelated states or events, such as in a state diagram. Moreover, not all illustrated acts are required to implement the methodologies in accordance with the present invention.

Figure 9:
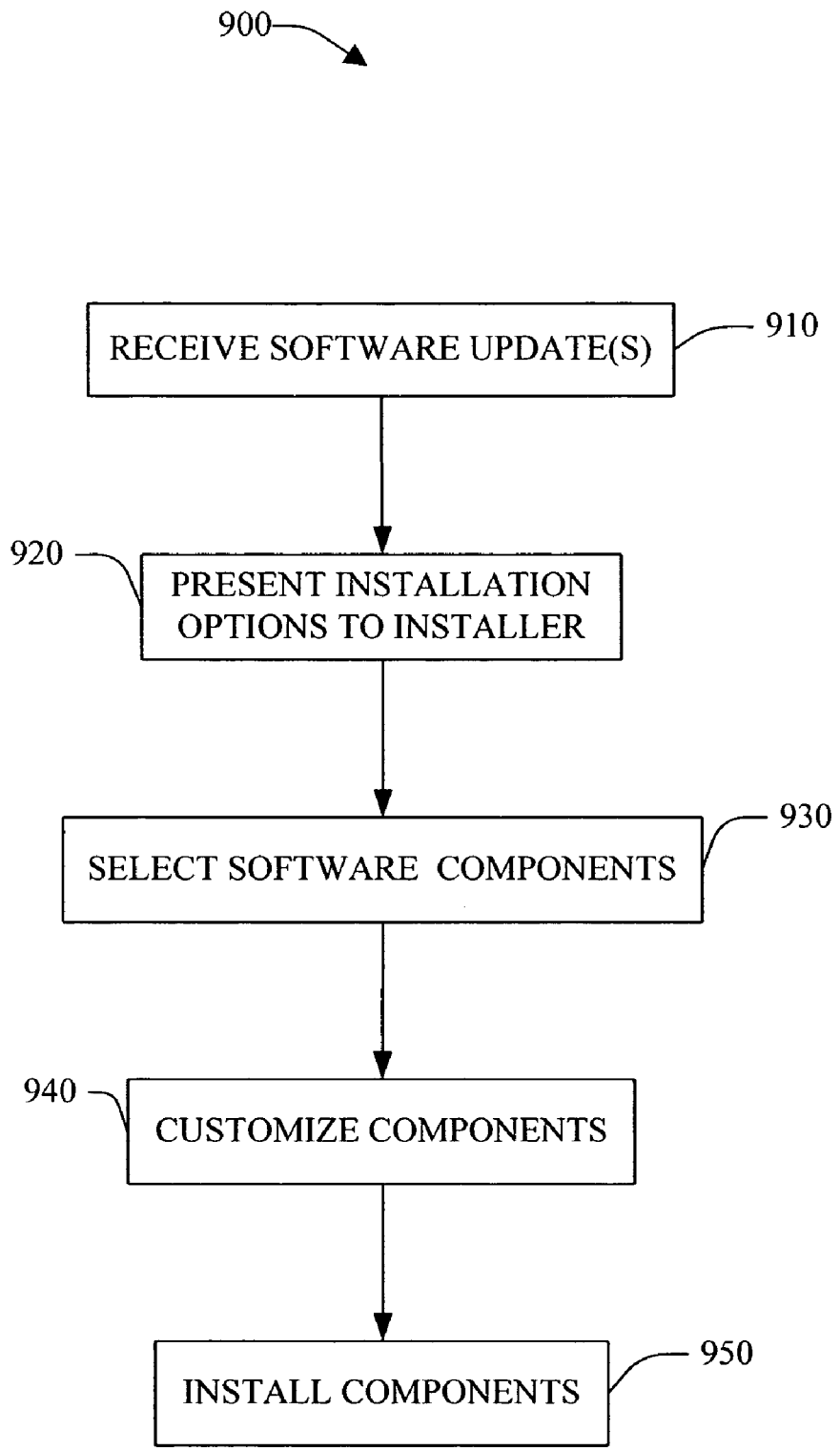
FIG. 9 illustrates an exemplary methodology for customizing a software update to include additional components.

Proceeding to FIG. 9, a methodology 900 for modifying a software update installation to include customization is illustrated. At reference numeral 910, one or more software updates are received. Such updates can be related to one or more operating systems, programs, applications, firmware, etc. and include various information. In addition, the software updates can be received as a compressed, encoded file, and/or encrypted file. Moreover, the software updates can be associated with various programming languages such as markup languages, C-based languages, and/or Visual basic, and provided as a binary, ASCII, and/or object files, for example.

At reference numeral 920, the software update can be presented to an installer as configuration options. For example, an API can be invoked and utilized to present graphical representations of end-user user interfaces to the installer. The graphical representations can include interactive images of the user interface, including controls, dialog layouts, visuals, text formatting, icons, menus, skins, menu items, etc. The items initially presented to the installer can be associated with a default configuration or can include all available items that can be installed.

At 930, the installer can interact through the API to select various controls, dialog layouts, visuals, text formatting, icons, menus, menu items, etc. to include in the installation of the software update. Selecting items can be achieved via a pointing device, keyboard keys, voice, etc. At 940, the installer can utilize the APIs to variously position and/or alter selected controls, dialog layouts, visuals, text formatting, icons, menus, menu items, etc. within a user interface. For example, the installer can re-size, re-locate and/or over-lap one or more items. At reference numeral 950, the customized configuration can be installed to a device.

Figure 10:
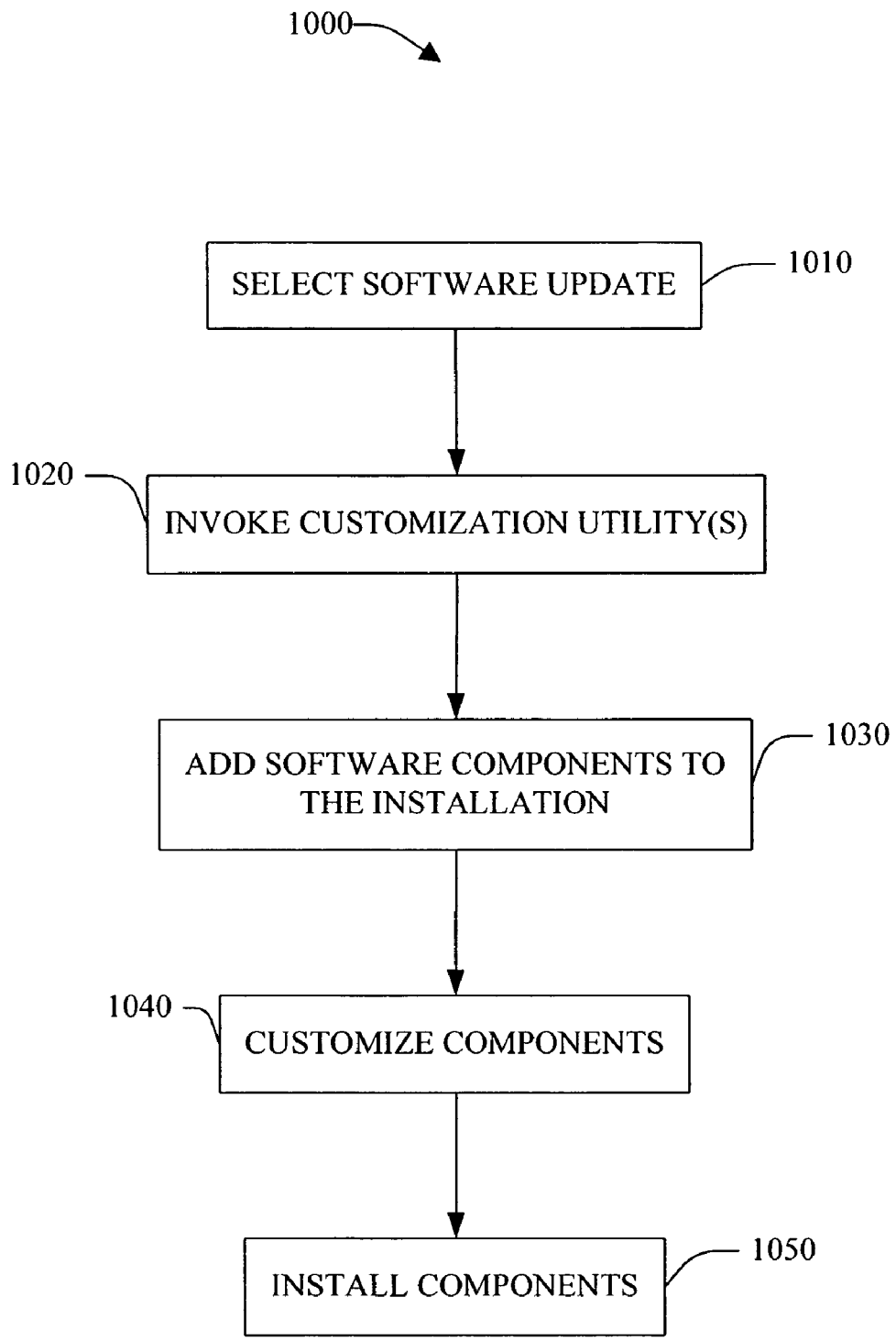
FIG. 10 illustrates an exemplary methodology for adding components to a customized software update.

FIG. 10 illustrates a methodology 1000 for adding components to a customized software update. At reference numeral 1010, one or more software updates is selected for installation. The software updates can be variously generated and packaged as described herein. At 1020, one or more APIs or other utilities are invoked. At least one of these utilities can be provided by a supplier (e.g., an owner, a developer, etc.) of the software update. For example, the supplier can provide the utility to facilitate installation of its software update. In other instances, the utility can be a proprietary interface generated by the installer of the software. Such utilities can be created by an operator, a manufacturer, a retailer, a wholesaler, a service provider, etc. associated with a device.

At reference numeral 1040, at least one of the invoked utilities is utilized to add components to a software update. For example, the installer can add a brand or logo. Such added components can be a port from a previous customization and/or a first time addition. Furthermore, the added components can be associated with disparate functionalities and/or aesthetics. At 1050, the software updates and/or added components can be variously arranged and formatted for a custom installation. At reference numeral 1056, the customized software update with added components can be installed to a device.

Figure 11:
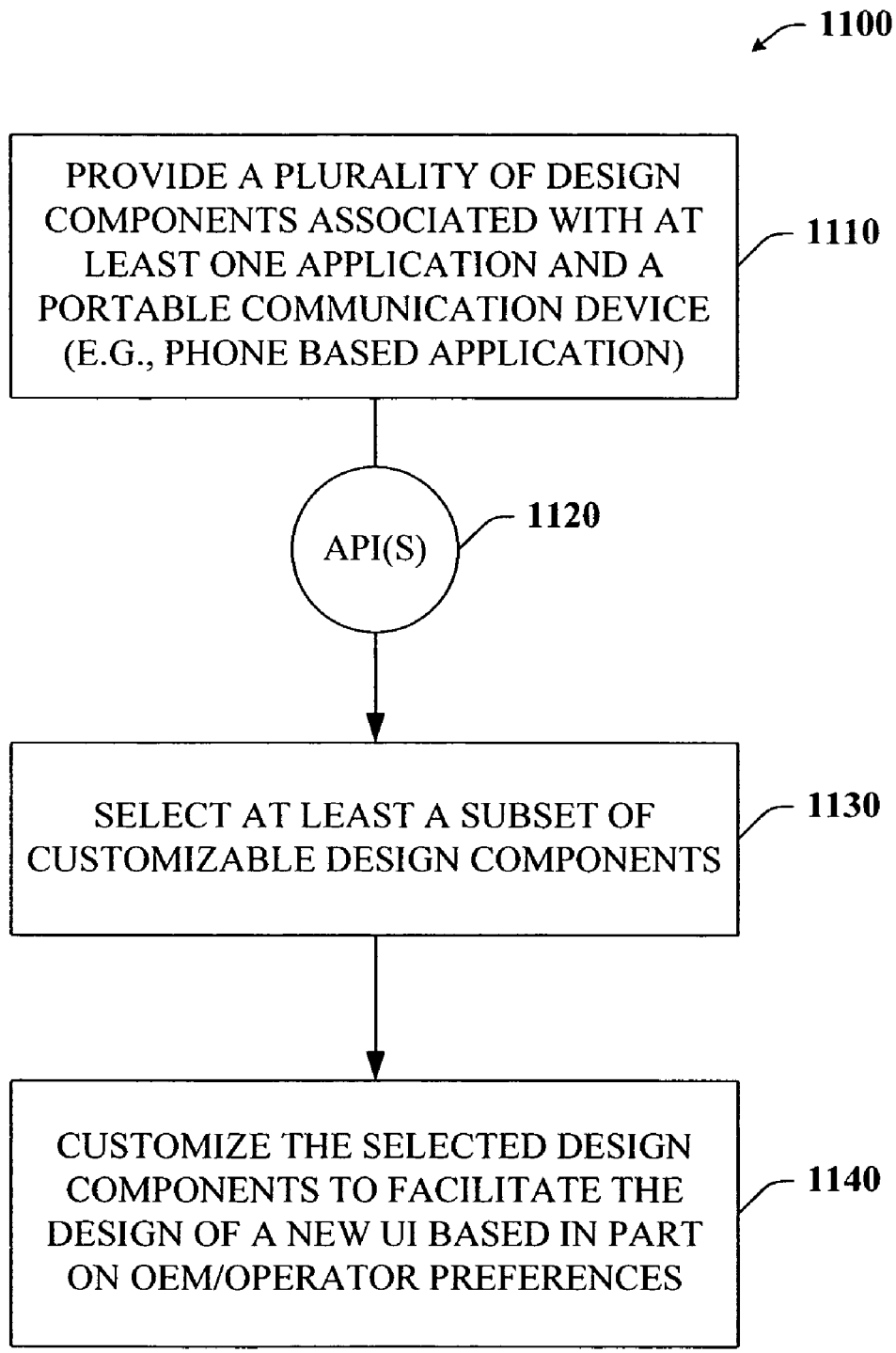
FIG. 11 illustrates an exemplary methodology that facilitates customizing and designing UIs of portable communication devices.

FIG. 11 illustrates an exemplary methodology 1100 that facilitates customizing and designing UIs of portable communication devices in a more efficient manner, based on the preferences of OEMs, operators and/or service providers. The method 1100 can involve providing a phone application that includes a plurality of design components associated therewith at 1110. The phone application can execute on any type of portable communication device such as a cellular phone, smartphone, or pocket PC, for instance. By employing one or more APIs at 1120, OEMs and/or operators can access and manipulate at least a subset of the design components at 1130 in order to customize them as desired at 1140. By way of example, an OEM can add a new feature control such as conference calling and/or remove a call-blocking feature. The layout of the controls can be adjusted to accommodate for any new icons or images associated with the conferencing call feature. Menu items can be changed as well to account for the new and removed features. Other design modifications to various features or controls can be easily performed without great effort such as re-writing code for the phone application. In one approach of the present invention, changes to registry values and the like, which are specific to the items or features being changed, can be instituted and carried out without substantially affecting the overall appearance of the UI. Hence, previous settings that do not wish to be changed can remain intact and can operate alongside with the new features.

Figure 12:
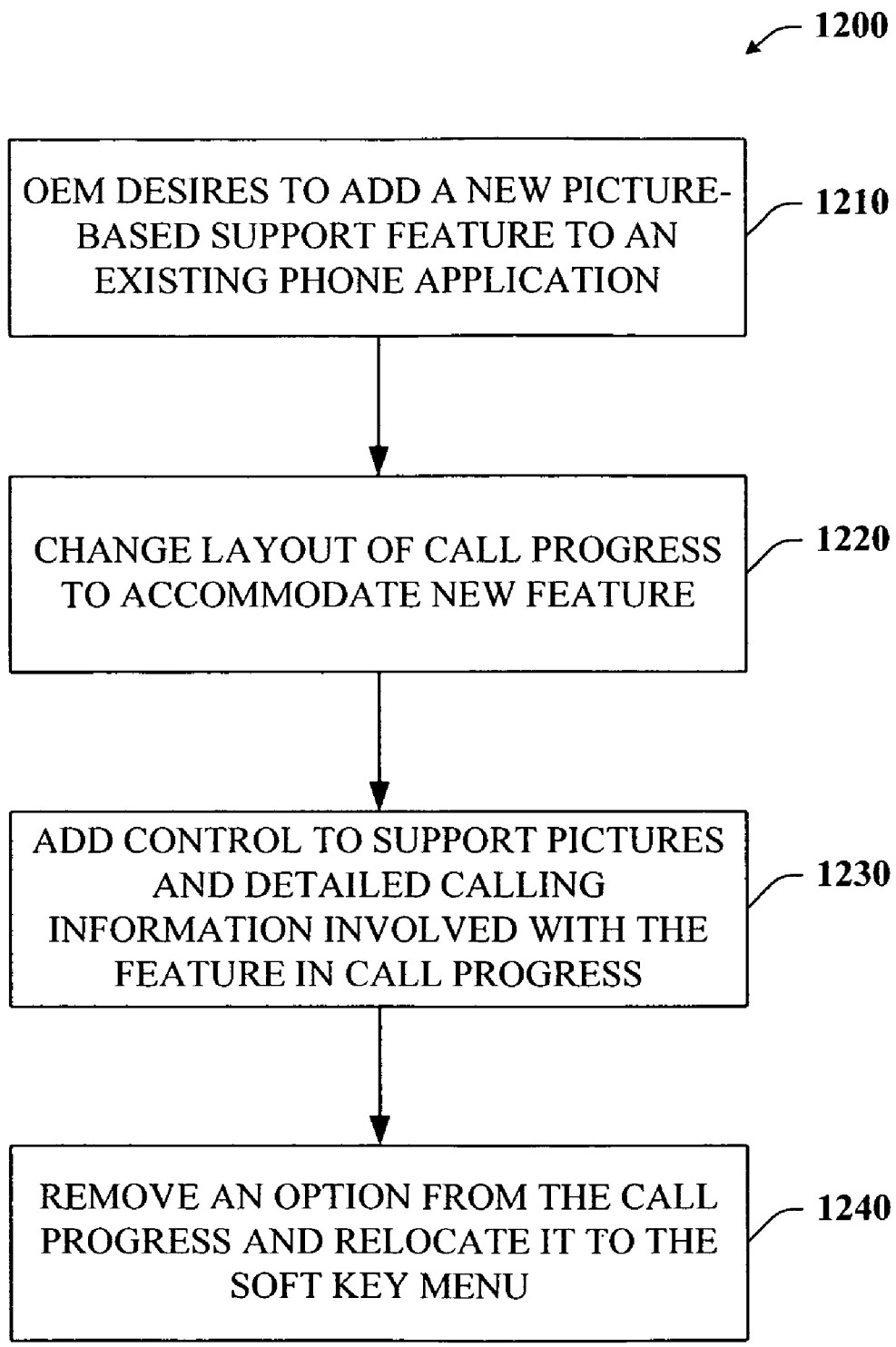
FIG. 12 illustrates an exemplary process that facilitates adding at least one new control and/or relocating at least one feature to a new area of the device.

FIG. 12 is illustrated an exemplary process 1200 that facilitates adding at least one new control and/or relocating at least one feature to a new area of the device in accordance with an aspect of the present invention. The process 1200 can begin at 1210 with an OEM desiring to add a new picture-based support feature to an existing phone application on a portable communication device. Such feature can permit a caller's picture to appear on the UI when a call from the caller is being received, for example. This can be accomplished at least in part by the OEM changing the layout of the call progress controls to accommodate the new feature at 1220. At reference numeral 1230, a new control can be added to support picture images and any detailed calling information that is associated with the new feature.

Any features that the OEM wishes to remove from the call progress can be removed as well and relocated to a softkey (SK) menu if desired at 1240. Moreover, the UI architecture of portable communication devices can be easily customized and designed according to OEM or operator specifications while keeping expenditures of time and effort at a minimum. Starting with a base level UI, various OEMs can alter control layout, control functionality (e.g., expose it or keep it hidden from end user), and control appearance and can add or remove controls and/or design components with relative ease and without disruption to other aspects of the phone application. Furthermore, the phone application(s) does not need to be rewritten when one or more updates are made to controls to preserve the look and feel of the UI. Rather, the UI remains intact except for the updates that are made.

Figure 14:
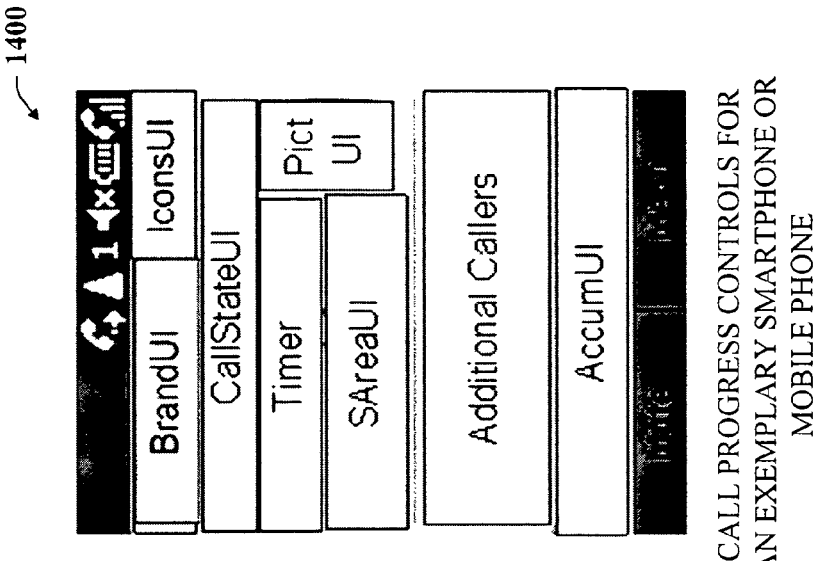
Figure 13:
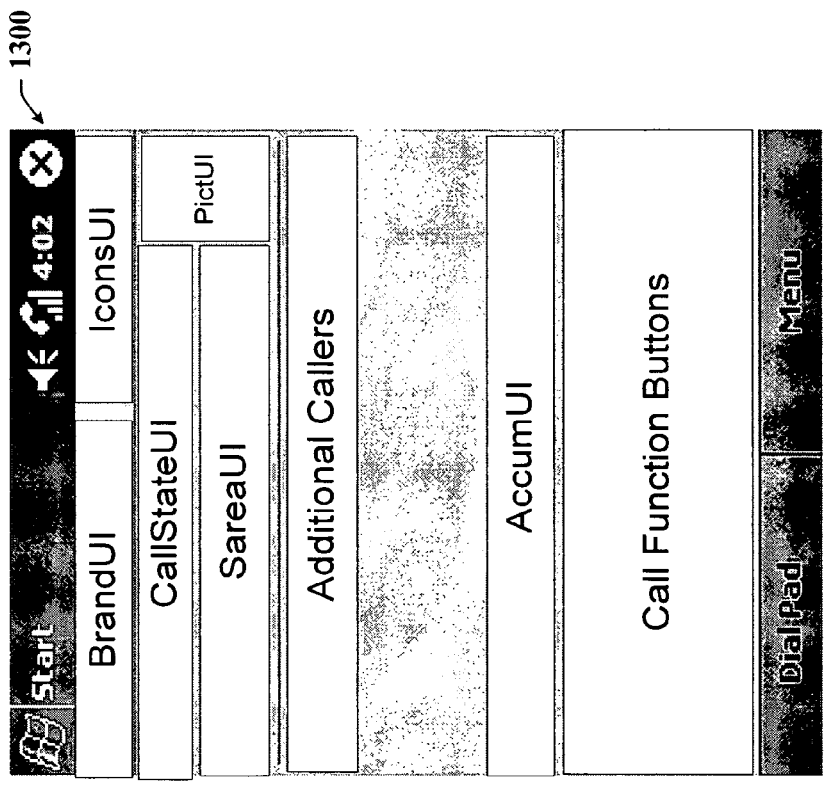
Figure 15:
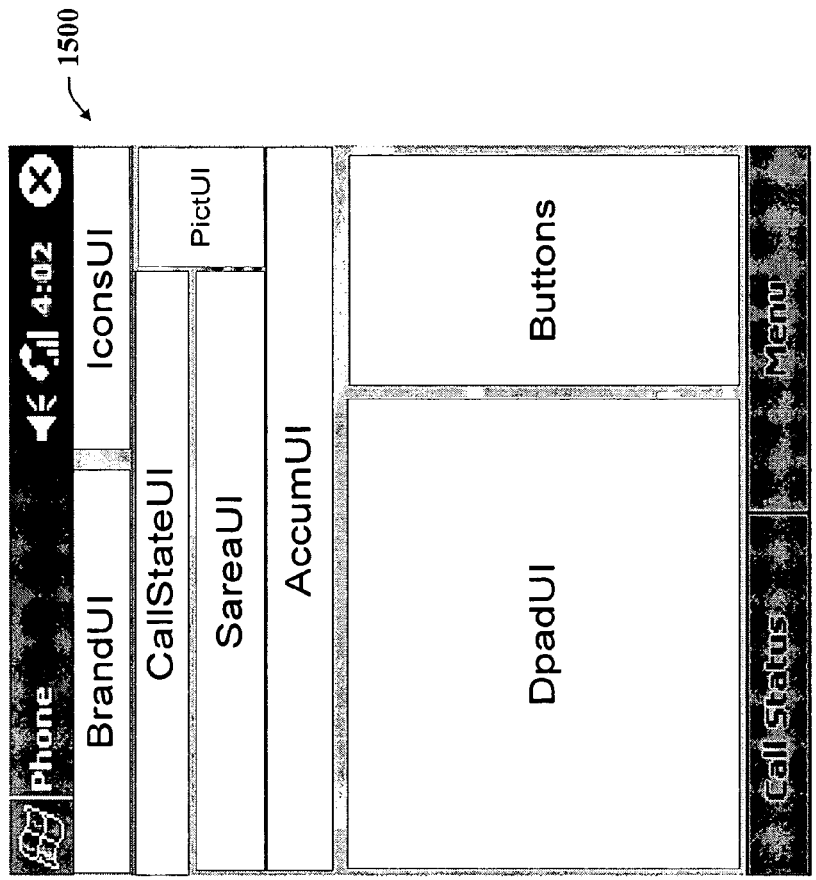

FIGS. 13-21 illustrate various views of exemplary UIs in connection with several aspects of the present invention. It is to be appreciate that this sample of views is provided for sake of brevity and illustrative purposes, and do not limit the invention. FIGS. 13 and 14 represent UI views 1300 and 1400, respectively, of default call progress controls as they can appear on a pocket PC or on a smartphone, for example. FIG. 15 depicts an exemplary UI view 1500 of dial pad controls for a pocket PC.

In order to enable an OEM to add additional functionality or change some of the default UI behavior within a call alert, a call progress and/or a dialpad view, common dialog models can be utilized. For example, dll's such as GetPhoneViewInfo.dll and ShowPhoneMsg.dll can be employed. The GetPhoneViewInfo.dll typically is called before creation of a phone dialog and/or during an orientation switch. This dll can allow the OEM to specify a dialog resource to create a view. The ShowPhoneMsg.dll can enable the OEM to intercept and/or replace various phone message boxes and/or bubbles.

For example, with this dll, the OEM can disable and/or replace USSD handling with USSD phase two support. In another example, the dll can allow the OEM to replace and/or enhance various error messages. To enable these OEM interfaces, the OEM generally must specify the dll that exports one or both of these functions via the registry.

The following registry value can allow the OEM to specify a dll with the code hooks for a phone application (e.g., code for new controls, etc.):

[HKEY_CURRENT_USER\ControlPanel\Phone]
"ext"="oemphone.dll";

This dll can be utilized to export GetPhoneViewInfo, ShowPhoneMsg, or both. Additionally, a COM-like interface, ICProg, via GetPhoneViewInfo and ShowPhoneMsg can be passed for the OEM to use for controlling phone state and listening for changes in phone state. The following exemplary registry values can control the formatting, bitmap changes and layout of the phone application controls:

[HKEY_CURRENT_USER\ControlPanel\Phone]
"ext"="oemphone.dll"
"bitmap"=1
"rc"="oemphone.dll"

Table 1 illustrates exemplary registry values, types and behavior that can be employed in accordance with an aspect of the present invention. As depicted in Table 1, "Ext" allows OEMs to request an application look for a dll that includes particular code hooks. "Bitmap" notifies the application whether to look for a registry value that will control bitmap changes of one or more of phone dialogs and/or controls. In one instance, when "Bitmap" is set to 1, registry keys (as specified below) can be utilized to control any bitmaps used, and when the "Bitmap" is set to 0, a default OS bitmap is employed and bitmap registry values are ignored. "Rc" indicates the OEM can specify a resource file for controlling a position of a control in a dialog view as well as an art utilized for phone icons. If this registry value is null, empty or does not exist, a default OS resource file is utilized. If "Ext," "Bitmap," and "Rc" do not exist, have invalid values, or are empty, then the default OS layout, art and/or controls can be used. This can be considered a mechanism that can be employed to allow an OS operator to reset any OEM UI implementation to the OS default phone UI upon a reset of these registry values and a reboot of the device.

TABLE 1

| Registry Value | Type | Behavior |
| --- | --- | --- |
| Ext | String | Specifies the file path for the dll that contains the code hooks for the phone app |
| Bitmap | Bit | Specifies whether or not to apply the reg key values that control bitmaps changes and formatting for the views and controls |
| Rc | String | Specifies the file path for the dll that is the resource file controlling an alternative layout of controls, art for the phone icons, etc. |

Respective controls in call progress, dial pad, and call alert can have text formatting characteristics specified in the registry. In addition, respective control images can be specified in the registry. These settings can be stored on a per view basis. In order to make changing bitmaps easier, controls can be drawn transparently on top of a background image specified for a particular view. Formatting can be controlled across dialog views or individually for each control. To apply changes across a dialog view, the following exemplary registry values can be set for the registry key.

[HKEY_CURRENT_USER\ControlPanel\Phone\
<CPROG_VIEW>]

where <CPROG_VIEW> is replaced with the name of the dialog view.

To control formatting and bitmaps for an individual control, the following exemplary registry values can be set.

[HKEY_CURRENT_USER\ControlPanel\Phone\
<CPROG_VIEW>\<Cnt 1>]

where <CPROG_VIEW> can be replaced with a name of a dialog view and <Cntl> can be replaced with the name of the individual control.

For pocket PC devices that have both Portrait and Landscape orientations, different formatting schemes and bitmaps can be applied for each orientation. The same registry values can be utilize to customize the application, but they can live in the following exemplary registry keys:

For Portrait:
[HKEY_CURRENT_USER\ControlPanel\Phone\
Portrait\<CPROG_VIE W>]

For Landscape:
[HKEY_CURRENT_USER\ControlPanel\Phone\
Landscape\<CPROG_VI EW>]

Setting text attributes for at least a portion of a view can update every control to utilize suitable font attributes. If, in addition, text attributes are set for an individual control, the settings for the individual control can override a view's settings. In the following table (Table 2), exemplary registry values for text formatting and corresponding behaviors are shown:

TABLE 2

| Registry Value | Type | Behavior |
| --- | --- | --- |
| textSize | String | Specifies the size of the font in pixel height |
| textColor | RGB value | Specifies the color of the font |
| textFlags | DWORD | Specifies if the alignment of the text; uses the standard flags from DrawText |
| lfFaceName | String | Specifies the name of the font to be used |

Images assigned to dialogs or controls can be variously formatted. GIFs, BMPs, JPGs, TIFs, etc. can be recommended for buttons in order to best define transparent pixel colors. If an image specified is larger than a size of a control, it can conform to an specified alignment (e.g., by bmpFlags) and, if no other scaling is specified (e.g., in bmpFlags), the image is clipped at the edges. In the following table (Table 3), exemplary registry values for background images and their corresponding behaviors are shown:

TABLE 3

| Registry Value | Type | Behavior |
| --- | --- | --- |
| backgroundColor | RGB value | If no bitmaps are assigned to the control, this gives the opaque background color painted for the control |
| bmpNormal | String | When assigned for an entire view, this value specifies the file path for the background image for the view. When assigned for an individual control, it specifies the control's background image for the default state |
| bmpFlags | DWORD | Specifies the alignment of the image (defined below) |
| bmpPressed | String | Applies only to button controls. Specifies the file path for the image of the button in the pressed state. |

TABLE 3-continued

| Registry Value | Type | Behavior |
|---|---|---|
| bmpDisabled | String | Specifies the file path for the image used in the control when it is in a disabled state. |
| bmpTransparency | DWORD | A color ref to be used as the transparency color or a predefined constant (defined below) to specify which pixel to use as the transparent color |

Table 4 illustrates flags that can be set to define scaling and alignment of bitmaps:

TABLE 4

| Name | Value | Behavior |
|---|---|---|
| BMF_HALIGN_LEFT | 0x00000000 | Aligns the bitmap to the left edge |
| BMF_HALIGN_CENTER | 0x00000001 | Aligns the bitmap to the center |
| BMF_HALIGN_RIGHT | 0x00000002 | Aligns the bitmaps to the right edge |
| BMF_HALIGN_TILE | 0x00000003 | Tiles the bitmap, aligning it to the left edge |
| BMF_HSCALING_STRETCH | 0x00000004 | Stretches the bitmap horizontally to fit within the bounds of the control |
| BMF_HSCALING_EVEN-MULTIPLES | 0x00000005 | Scale to even multiples of the bitmap's original horizontal dimensions |
| BMF_HSCALING_USE-MIDDLE | 0x00000006 | Remove lines from the middle to scale down, duplicate middle to scale up |
| BMF_VALIGN_TOP | 0x00000000 | Aligns the bitmap to the top edge |
| BMF_VALIGN_CENTER | 0x00000010 | Aligns the bitmap to the center |
| BMIF_VALIGN_BOTTOM | 0x00000020 | Aligns the bitmap to the bottom |
| BMF_VALIGN_TILE | 0x00000030 | Tiles the bitmap, aligned to the top |
| BMF_VSCALING_STRETCH | 0x00000040 | Stretches the bitmap vertically to fit within the bounds of the control |
| BMF_VSCALING_EVEN-MULTIPLES | 0x00000050 | Scale to even multiples of the bitmap's original vertical dimensions |
| BMF_VSCALING_USE-MIDDLE | 0x00000060 | Remove lines from the middle to scale down, duplicate middle line to scale up |

Table 5 illustrates exemplary transparency constants. These flags determine which color in a given control appears transparent against a dialog background. If a value of a flag maps to one of the following constants, a color of that pixel is utilized to determine a color that will be transparent. If a value does not map to a transparency constant, a value is read as an RGB value, which defines the color of the transparency.

TABLE 5

| Name | Value | Description |
|---|---|---|
| BMT_TOPLEFTPIXEL | 0x01000000 | Use the top-left pixel in the bitmap as the transparent color |
| BMT_TOPRIGHTPIXEL | 0x02000000 | Use the top-right pixel in the bitmap as the transparent color |
| BMT_BOTTOMLEFTPIXEL | 0x03000000 | Use the bottom-left pixel in the bitmap as the transparent color |
| BMT_BOTTOMRIGHTPIXEL | 0x04000000 | Use the bottom-right pixel in the bitmap as the transparent color |

Table 6 illustrates default branding behavior that can be exemplified.

TABLE 6

| Location | Default | Max Length for Text String |
|---|---|---|
| Dialer/Call Progress | Will show carrier branding image if it exists. If image is not present then will show the currently registered network string (text). | Limited by the width of the BrandUI control. |
| SIM Security | Will show carrier branding bitmap if it exists and nothing if not. | Limited by the width of the BrandUI control. |
| Signal Strength | Will show the branding image if we have it, otherwise we'll show text for the currently registered network. | 16 chars per GSM spec (GSM 07.07 section 7.3 (under +COPS <oper>). 16 characters is max length if you get it form the SIM or radio). |
| Incoming Call | Will show carrier branding bitmap if it exists, otherwise we'll show text. | 16 chars per GSM spec |

To change a default behavior, the following registry value can be set.
 [HKEY_LOCAL_MACHINE\Software\Microsoft\Shell\Phone\GroupBra nding] (DWORD)
wherein the GroupBranding registry value typically utilizes three bitfields per group in a dword, which allows a maximum of 10 unique groupings. For example, the following groups can exist:
 |x|x|9|9|9|8|8|8|7|7|7|6|6|6|5|5|5|4|4|4|3|3|3|2|2|2|1|1|1|0|0|0| wherein 0=Dialer; 1=Incoming Call; 2=SIM Password; and 3=Signal Strength. In addition, for Bit 0, 0=Always show home carrier and 1=Always show current registered network; for Bit 1, 1=Show text carrier name; and for Bit 2, 1=Show bitmap for carrier.
 If the value does not exist, then the following defaults can be utilized:

| Signal Strength | SIM Password | Incoming Call | Dialer |
|---|---|---|---|
| 0 1 1 | 1 1 0 | 1 1 0 | 1 1 0 | which translate to:
 011=SigStrength, 110=SIMSec, 110=IncomingCall, 110=Dialer=011110110110=0x7b6.
 By setting all bits to zero (SHCBF_SHOW_TEXTOVERRIDE), a branding helper function can return a brand override text shown in a registry value below.
 HKEY_LOCAL_MACHINE\Software\Microsoft\Shell\Phone\BrandOver ride "Carrier Blah"
 The carrier branding image can be loaded from a logo.X file (wherein X=GIF, JPG, BMP, TIF, etc.), for example, and substantially all locations on PPC can utilize this image.

Table 7 illustrates examples of Bitmap, text, home/roaming values that can be set and corresponding descriptions.

TABLE 7

| Bitmap (Bit 2) | Text (Bit 1) | Home or Roaming Network (Bit 0) | Hex | Description |
|---|---|---|---|---|
| 0 | 0 | 0 | 0000 | Show override text string |
| 0 | 0 | 1 | 0249 | Show nothing |
| 0 | 1 | 0 | 0492 | Only show text |
| 0 | 1 | 1 | *** | Same as 110 |
| 1 | 0 | 0 | *** | Same as 010 as RIL can't give us home network when roaming |
| 1 | 0 | 1 | 0B6D | Show bitmap if on home network, if roaming show nothing |
| 1 | 1 | 0 | 0DB6 | Show bitmap if it exists, otherwise show text |
| 1 | 1 | 1 | 0FFF | Show bitmap if on home network, if roaming show text |

OEMs can choose which OS-supported icons are shown in an icon control within supported phone application views. To do so, the user can set a registry value under the exemplary key:

[HKEY_CURRENT_USER\ControlPanel\Phone\<CPROG_VIEW>\<Cnt 1>]

where <CPROG_VIEW> can specify a name of a phone view and <Cntl> can specify a name of an icon control in that view.

The following registry value controls the icon display:

| Registry Value | Type | Behavior |
|---|---|---|
| Icons | DWORD | Specifies which OS-supplied icons are displayed in the icon control |

Table 8 illustrates exemplary values that can be utilized to specify whether an associated icon is displayed:

TABLE 8

| Icon | Value |
|---|---|
| ICON_ROAM | 0x0001 |
| ICON_MUTE | 0x0002 |
| ICON_ANALOG | 0x0004 |
| ICON_CALLFWD | 0x0008 |
| ICON_CALLFWD1 | 0x0010 |
| ICON_CALLFWD2 | 0x0020 |
| ICON_VPRIVACY | 0x0080 |
| ICON_GPRS | 0x0100 |
| ICON_1XRTT | 0x0200 |
| ICON_LOCATIONON | 0x0400 |
| ICON_LOCATIONOFF | 0x0800 |
| ICON_BUSY | 0x1000 |
| ICON_ANALOGROAM | 0x2000 |
| ICON_DIGITALROAM | 0x4000 |

OEMs can additionally change a bitmap utilized for an existing icon by supplying a new imagelist bitmap for icons. This bitmap can be specified via the following registry key:

[HKEY_CURRENT_USER\ControlPanel\Phone\<CPROG_VIEW>\<Cntl>]

where <CPROG_VIEW> specifies the name of the phone view and <Cntl> specifies the name of the icon control in that view.

The following registry value controls the icon display:

| Registry Value | Type | Behavior |
|---|---|---|
| bmpIcons | String | File path for the icons bitmap |

The following is an example of an imagelist bitmap that can be used to define art for several phone icons.

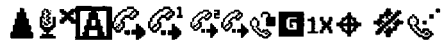

In order to change a key string in a phone application, OEMs can utilize a similar registry model provided on a smartphone, for example. Such registry keys and/or values can be made to work on pocket PC as well. The following registry key contains the values for the string changes.

[HKLM\SW\MSFT\ResOver\<langid>]

where <langid> specifies the language code.

Each string that is able to be changed is assigned an enum value. To change the string, a registry value can be created with a given value under the above path. The UI string can be changed to a string specified by a registry value. If no registry value is present for a given enum value, the UI text is not overwritten by the OEM. Exemplary icons and their associated enum values are depicted in Table 9.

TABLE 9

| Icon | Enum Value |
|---|---|
| IDS_VOICEMAIL | 0 |
| IDS_CDI_RADIO_TELEPHONE_NUMBER | 1 |
| IDS_CDI_RADIO_TELEPHONE_NUMBER_ABBR | 2 |
| IDS_RADIO_NAME | 3 |
| IDS_RADIO_TELEPHONE_NUMBER_ABBREV | 4 |
| IDS_PHONE_ABBREV | 5 |
| IDS_ABBR_PROP+15 | 6 |
| IDS_REJECT | 7 |
| IDS_NEWVOICEMAILBUTTON | 8 |
| IDS_NEWVOICEMAILBUTTON | 9 |
| IDS_SIM_FAILURE | 10 |
| IDS_NOSIM | 11 |
| IDS_SIMPINREQUIRED | 12 |
| IDS_SIMPUKREQUIRED | 13 |
| IDS_EARPIECE_VOLUME | 14 |

Figures 16, 17:
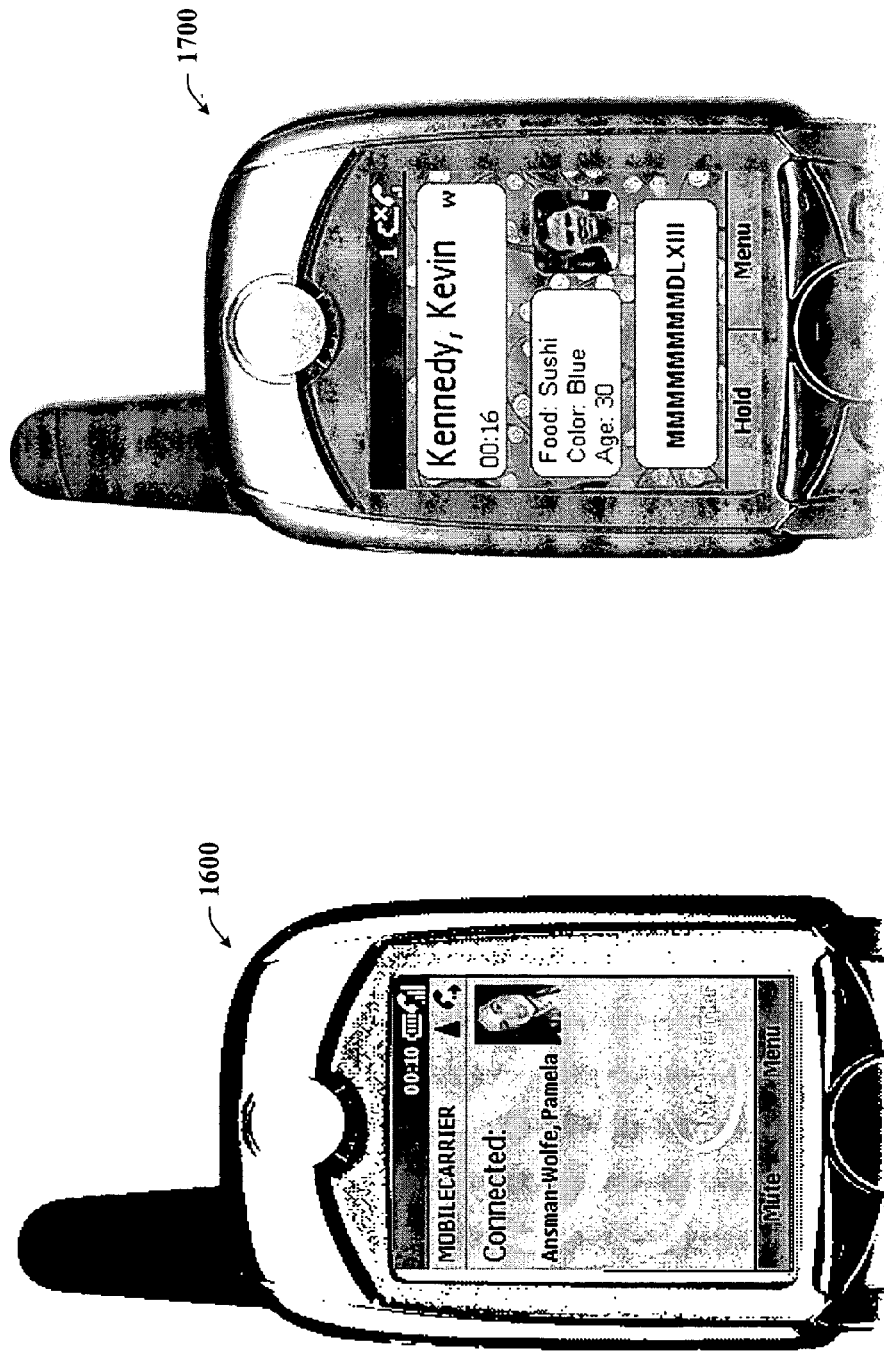

Turning now to FIGS. 16 and 17, exemplary user interfaces from an OS default portable communication device 1600 and an operator customized portable communication device 1700, respectively, are illustrated. By way of example, an operator XYZ (e.g., service provider) can desire to customize a look and feel of phone applications to suit an individual brand. Utilizing a customizable architecture according to the present invention and the OS default device 1600, the operator can change the layout, enhance various controls, as well as add new controls to obtain a substantially customized device 1700. In addition, the OEM can add a function to a current phone application such as picture-based conference calling support. Utilizing the customizable architecture of the present invention, the OEM can perform the following: change the layout of Call Progress to accommodate their new feature; add controls to support pictures and detailed conference call information in Call Progress; remove the "View Calendar" option from Call Progress and add it to the SK (soft key) menu. Thus, after a few acts, the OEM can successfully change the general look and feel of the accumulator and call progress as demonstrated in the exemplary user interface views 1800 and 1900 of an OS base UI and an OEM customized UI, respectively, in FIGS. 18 and 19.

Figure 20:
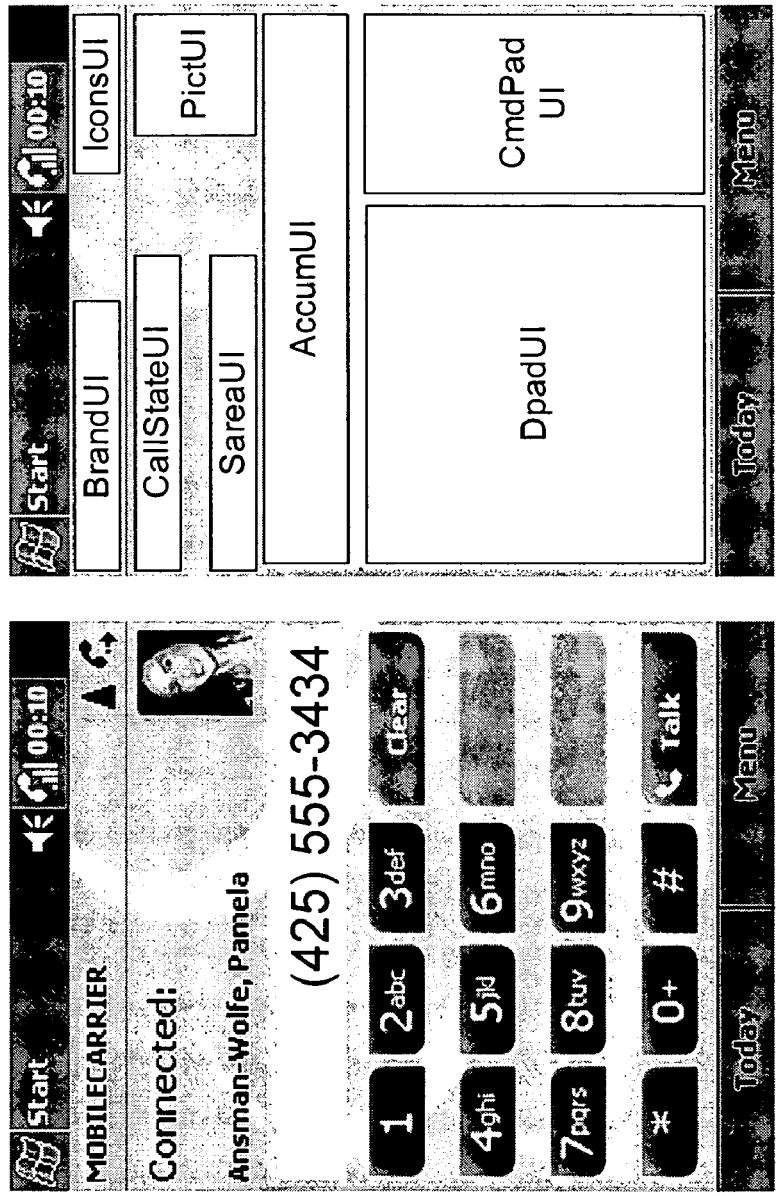
Figure 21:
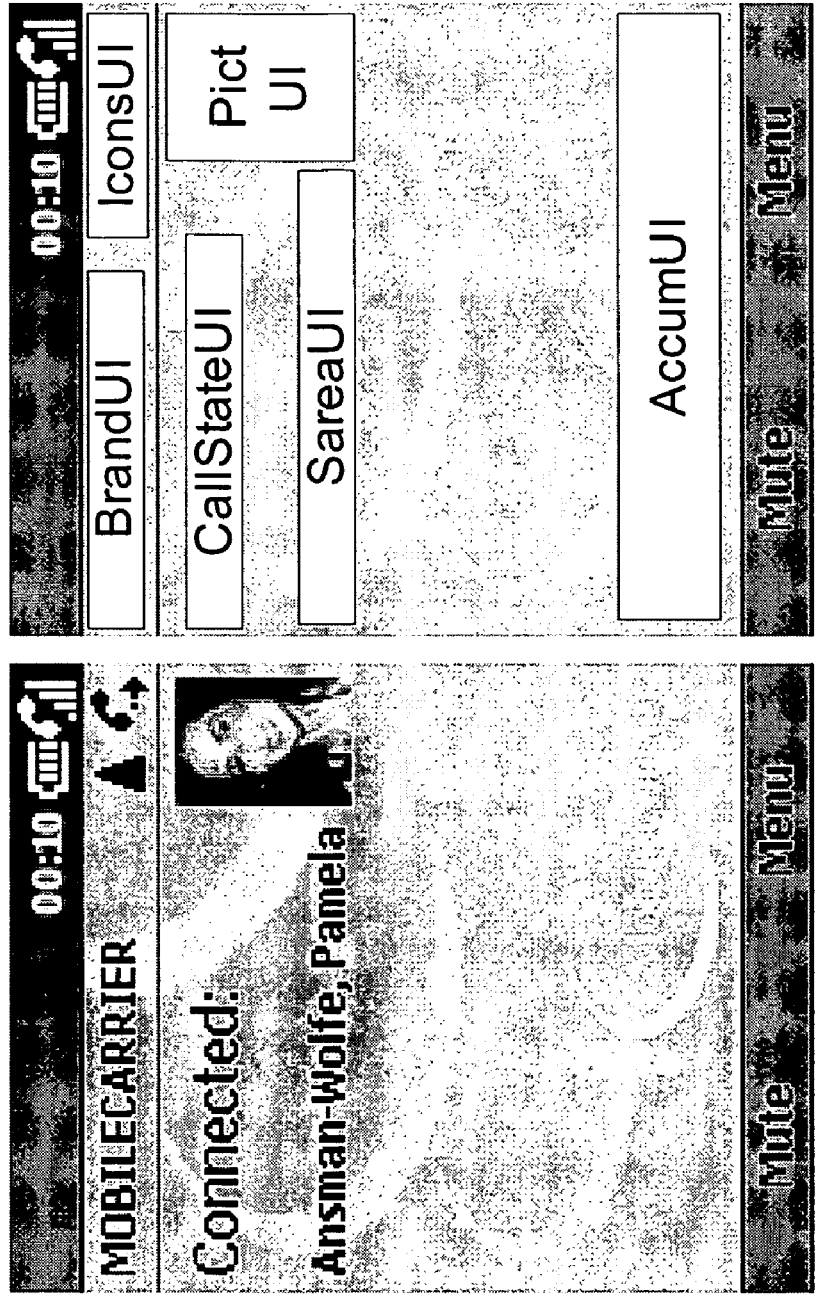

FIGS. 20 and 21 illustrate exemplary views of a plurality of phone components on a pocket PC (PPC) device 2000 and a mobile or smart phone (SP) device 2100 in connection with the present invention. In particular, a phone application for instance can be grouped into various components or controls. One exemplary set of components is shown in FIGS. 20 and 21. Descriptions of various components are provided bellow.

| Component | PPC/SP | Description |
|---|---|---|
| AccumUI | PPC/SP | Displays the numbers/characters entered on the keypad. |
| CmdPadUI | PPC | Used on PPC as a touch screen buttons to access phone related functionality (Call History, Speed Dial, Swap, Hold, etc.) |
| DPadUI | PPC | Used on PPC as touch screen buttons to enter numbers (and DTMF tones) in the dialer. |
| SAreaUI | PPC/SP | Displays call related information (phone number, call id match, 2 line status, etc.) |
| ElapsdUI | PPC/SP | Displays the call timer. |
| IconsUI | PPC/SP | Displays the phone related icons (including roaming, forwarding status, voice privacy, etc.). |
| BrandUI | PPC/SP | Displays the Operator name and branding image. |
| PictUI | PPC/SP | Displays the picture associated with the user on the call. |
| CallStateUI | PPC/SP | Displays call state related information (including dialing state, connected, conference call, etc.) |
| General background | PPC/SP | This is the general background image that is shown from Call Progress. |
| Menu Extensibility | PPC/SP | Dialer and Call Progress menu items can be removed or added to. |

Various aspects of the phone and its components can be customized. In general, a phone component can support the following features.

1. Resizable: The area that the component occupies on the screen can be resized.
2. Moveable: The component can be moved to a different location on the screen.
3. Removable: The component can be hidden from being displayed on the screen.
4. Can be Modified/Enhanced: An existing component can be modified or enhanced with new functionality. Note that not all components will support this functionality.

Table 10 provides more detailed information of the customization that is supported for each phone component in terms of support levels 1, 2, and 3:

TABLE 10

| Component | Level 1 | Level 2 | Level 3 |
|---|---|---|---|
| AccumUI | General App wide font color | Font Color per control Background | Font Font Size |
| CmdPadUI | General App wide font color Change button text and functionality | Font Color per control Depressed Font Color per control Background Depressed Background | Font Font Size Depressed Font Depressed Font Size |
| DPadUI | General App wide font color Dial pad background Dial pad down state buttons | Font Color per control Depressed Font Color per control Individual buttons up and down state | Font Font Size Depressed Font Depressed Font Size |
| SAreaUI | General App wide font color | Font Color per control Background | Font Font Size |
| ElapsdUI | General App wide font color | Font Color per control Background | Font Font Size |
| IconsUI | Show/Hide individual icons Swap/Add icon with new icon | Background | Change icon display slot |
| BrandUI | General App wide font color | Font Color per control Background | Font Font Size |
| PictUI | | Background | |
| CallStateUI | General App wide font color | Font Color per control Background | Font Font Size |
| General background | | Background | |

Figure 22:
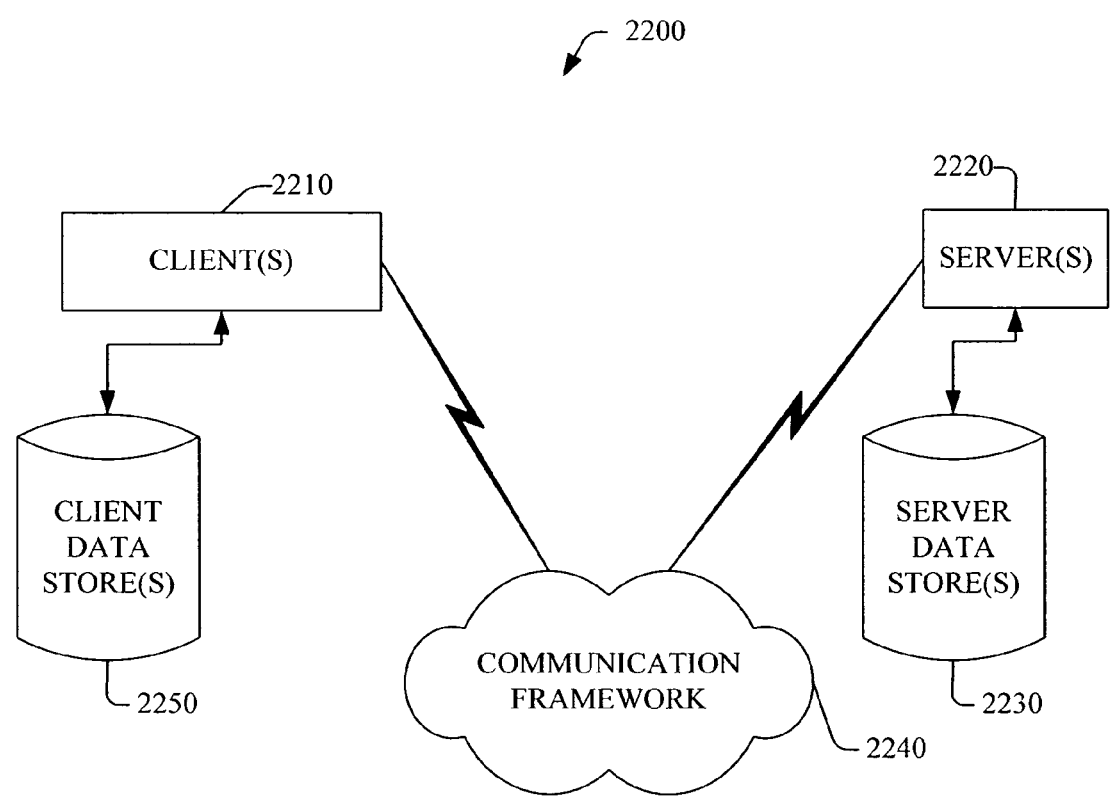
FIG. 22 illustrates an exemplary networking environment, wherein the novel aspects of the present invention can be employed.
Figure 23:
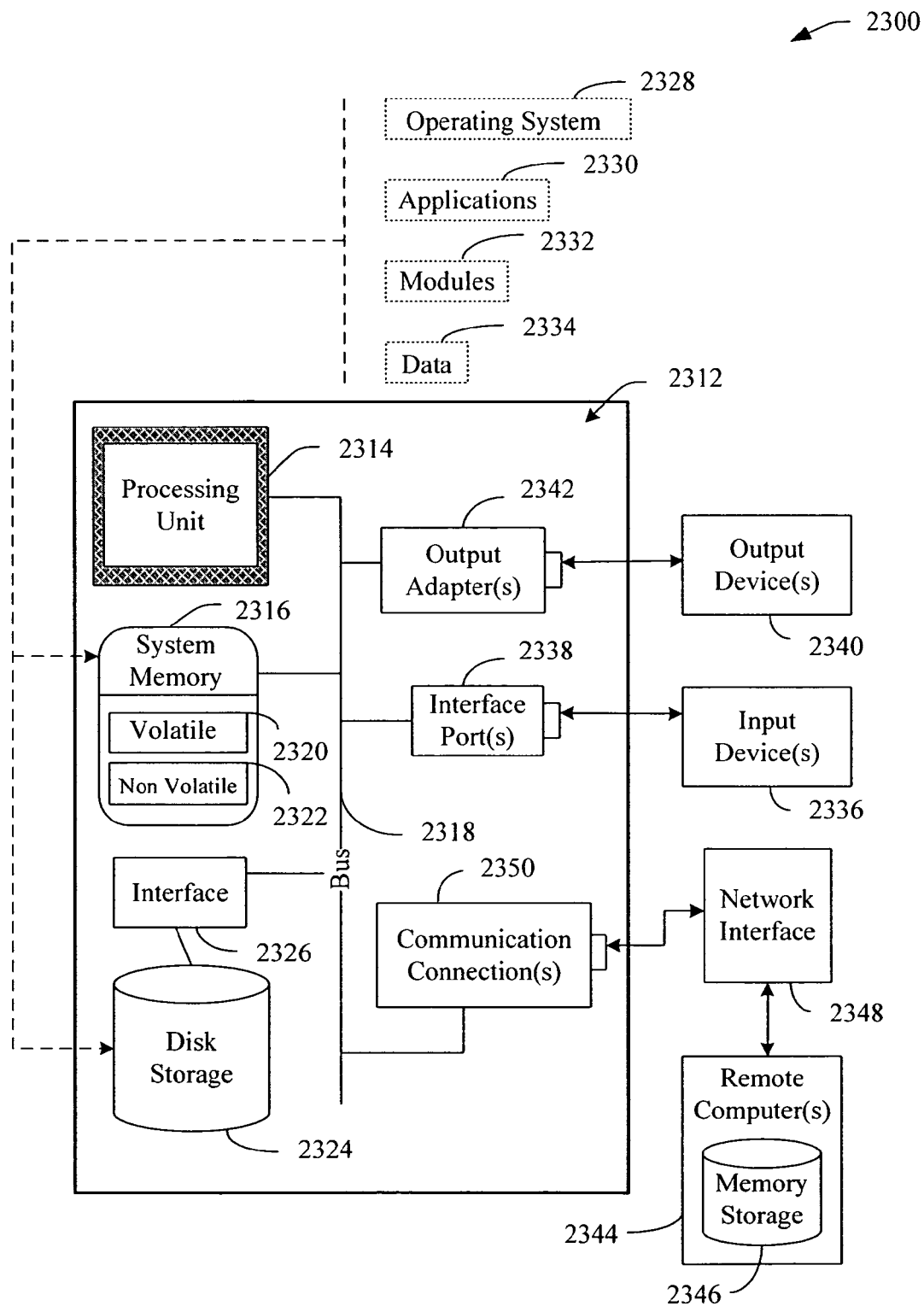
FIG. 23 illustrates an exemplary operating environment, wherein the novel aspects of the present invention can be employed.

In order to provide additional context for implementing various aspects of the present invention, FIGS. 22-23 and the following discussion is intended to provide a brief, general description of a suitable computing environment in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 22 illustrates a sample-computing environment 2200 in which the present invention can interact. The system 2200 includes one or more client(s) 2210. The client(s) 2210 can be hardware and/or software (e.g., threads, processes, computing devices). The system 2200 further includes one or more server(s) 2220. The server(s) 2220 can also be hardware and/or or software (e.g., threads, processes, computing devices). The servers 2220 can house threads to perform transformations by employing the present invention, for example.

One possible communication between a client 2210 and a server 2220 can be in the form of a data packet adapted to be transmitted between two or more computer processes. The system 2200 includes a communication framework 2240 that can be employed to facilitate communications between the client(s) 2210 and the server(s) 2220. The client(s) 2210 are coupled to one or more client data store(s) 2250 that can be employed to store information local to the client(s) 2210. Similarly, the server(s) 2220 can be coupled to one or more server data store(s) 2230 that can be employed to store information local to the servers 2220.

With reference to FIG. 23, an exemplary environment 2300 for implementing various aspects of the invention includes a computer 2312. The computer 2312 includes a processing unit 2314, a system memory 2316, and a system bus 2318. The system bus 2318 couples system components including, but not limited to, the system memory 2316 to the processing unit 2314. The processing unit 2314 can be any of various available processors. Dual microprocessors and other multi-processor architectures also can be employed as the processing unit 2314.

The system bus 2318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 2316 includes volatile memory 2320 and nonvolatile memory 2322. The basic input/output system (BIOS), containing the basic routines to transfer information between elements within the computer 2312, such as during start-up, is stored in nonvolatile memory 2322. By way of illustration, and not limitation, nonvolatile memory 2322 can include read only memory (ROM), programmable ROM (PROM), electrically programmable ROM (EPROM), electrically erasable ROM (EEPROM), or flash memory. Volatile memory 2320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2312 also includes removable/non-removable, volatile/non-volatile computer storage media. FIG. 23 illustrates, for example a disk storage 2324. Disk storage 2324 includes, but is not limited to, devices like a magnetic disk drive, floppy disk drive, tape drive, Jaz drive, Zip drive, LS-100 drive, flash memory card, or memory stick. In addition, disk storage 2324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2324 to the system bus 2318, a removable or non-removable interface is typically used such as interface 2326.

It is to be appreciated that FIG. 23 describes software that acts as an intermediary between users and the basic computer resources described in the suitable operating environment 2300. Such software includes an operating system 2328. Operating system 2328, which can be stored on disk storage 2324, acts to control and allocate resources of the computer system 2312. System applications 2330 take advantage of the management of resources by operating system 2328 through program modules 2332 and program data 2334 stored either in system memory 2316 or on disk storage 2324. It is to be appreciated that the present invention can be implemented with various operating systems or combinations of operating systems.

A user enters commands or information into the computer 2312 through input device(s) 2336. Input devices 2336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2314 through the system bus 2318 via interface port(s) 2338. Interface port(s) 2338 include, for example, a serial port, a parallel port, a game port, and a universal serial bus (USB). Output device(s) 2340 use some of the same type of ports as input device(s) 2336. Thus, for example, a USB port may be used to provide input to computer 2312, and to output information from computer 2312 to an output device 2340. Output adapter 2342 is provided to illustrate that there are some output devices 2340 like monitors, speakers, and printers, among other output devices 2340, which require special adapters. The output adapters 2342 include, by way of illustration and not limitation, video and sound cards that provide a means of connection between the output device 2340 and the system bus 2318. It should be noted that other devices and/or systems of devices provide both input and output capabilities such as remote computer(s) 2344.

Computer 2312 can operate in a networked environment using logical connections to one or more remote computers, such as remote computer(s) 2344. The remote computer(s) 2344 can be a personal computer, a server, a router, a network PC, a workstation, a microprocessor based appliance, a peer device or other common network node and the like, and typically includes many or all of the elements described relative to computer 2312. For purposes of brevity, only a memory storage device 2346 is illustrated with remote computer(s) 2344. Remote computer(s) 2344 is logically connected to computer 2312 through a network interface 2348 and then physically connected via communication connection 2350. Network interface 2348 encompasses communication networks such as wire and/or wireless local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2350 refers to the hardware/software employed to connect the network interface 2348 to the bus 2318. While communication connection 2350 is shown for illustrative clarity inside computer 2312, it can also be external to computer 2312. The hardware/software necessary for connection to the network interface 2348 includes, for exemplary purposes only, internal and external technologies such as, modems including regular telephone grade modems, cable modems and DSL modems, ISDN adapters, and Ethernet cards.

What has been described above includes examples of the present invention. It is not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In regard to various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes" and variants thereof are used in the detailed description or the claims, these terms are intended to be inclusive in a manner similar to the term "comprising."

What is claimed is:

1. A computer-based architecture that facilitates customization of an original equipment manufacturers portable communication device, comprising:
    a processor, wherein the processor is configured to:
        expose at least one customizable design component of a software update via an API, wherein each customizable design component may be associated with at least one customized code;
        receive at least one selected design component and at least one reference to a respective customized code via the API; and
        configure the portable communication device to provide a functionality associated with the at least one selected design component and the respective customized code; and
    an isolation component that masks design selection information from one OEM to another.

2. A portable device created in accordance with the architecture of claim 1, the selected design components appearing permanent to an end user.

3. The portable device of claim 2, wherein each of the at least one selected design component is configured in accordance with configuration parameters.

4. The architecture of claim 1, wherein each of the at least one customizable design component corresponds to a plurality of controls in connection with a phone-based application operating on the portable communication device.

5. The architecture of claim 1, wherein the at least one design component comprises at least one of call progress controls and dial pad controls.

6. The architecture of claim 1, wherein the at least one design component comprises at least one of layout controls, branding elements, color controls, background controls, font controls, icon controls, image controls, and softkey menu controls.

7. The architecture of claim 1, wherein the portable communications device comprises any one of a mobile phone, a smartphone, and a pocket PC.

8. A computer-readable storage medium having stored thereon computer-executable instructions that facilitates design of a portable communication device by operators or service providers, comprising:
    receiving at least one selected design component and at least one reference to a respective customized code via an API wherein each of the at least one selected design component is selectively customizable and associated with at least one phone-based application, wherein the API exposes graphical representations of the design components;
    configuring the portable communication device to provide a functionality associated with the at least one selected design component and the respective customized code; and
    providing an isolation component that masks design selection information from one OEM to another.

9. A portable device created in accordance with the instructions of claim 8.

10. A user interface (UI) architecture customization computer-implemented method comprising:
    providing a plurality of customizable design components stored on a computer-readable storage medium; exposing an OEM or operator to customize an UI architecture for one or more portable communication devices by way of an API, the API comprising a presentation region; and
    selecting at least a subset of design components corresponding to specific changes desired by the OEM or operator to the UI to facilitate designing and customizing the UI architecture on the one or more portable communication devices, the selection of at least the subset of design components is dynamically viewable on the presentation region of the API; and
    masking customized UI architecture from one OEM to another.

11. The method of claim 10, the operator comprises a service provider of communication services.

12. The method of claim 10, selecting the subset of design components to customize the UI architecture is performed according to the OEM or operator preferences.

13. The method of claim 10, further comprising adding one or more new feature controls to the UI architecture by way of one or more design components and the API.

14. The method of claim 10, further comprising masking customized UI architecture thereby allowing the UI to appear permanent to the OEM device's end user.

15. A UI architecture customization system that includes computer-readable storage medium having stored thereon computer-executable components comprising:
    means for providing a plurality of customizable design components;
    means for exposing an OEM or operator to customize an UI architecture for portable communication devices by way of an API;
    means for selecting at least a subset of design components corresponding to specific changes desired by the OEM or operator to the UI to facilitate designing and customizing the UI architecture, the means for selecting at least the subset of design components occurs in a region provided by the API that supports manipulation graphical objects; and
    means for masking customized UI architecture from one OEM to another.

16. A computer-implemented system that facilitates customizing a software installation, comprising:
    a component that receives a software update associated with a user interface (UI) via an API; and
    a presentation component that displays a preview of a default UI as defined in the software update and dynamically presents previews of any alteration, manipulation, or change to the default UI as defined in the software update in one or more presentation region, wherein the default UI is altered, manipulated, or changed to generate a UI installation configuration that creates a customized UI according to the altered, manipulated, or changed preview when the software update is installed.

17. The system of claim 16, further comprising a component that enables an addition of proprietary or third party software components to the installation configuration, the added software components further customizing the UI.

18. The system of claim 16, wherein the presentation component provides a manufacturer, operator, or service provider brand that is incorporated into the UI during installation of the software update.

19. The system of claim 16, wherein the presentation component provides for selecting at least one of a control, a button, a menu, a menu item, an icon, a color scheme, a visual, a text format, and an audio tone for installation with the UI.

20. The system of claim 16, wherein the presentation component re-positions at least one of a control, a button, a menu, an icon, and a menu item within the UI.

21. The system of claim 16, wherein the preview of the default UI is altered through one of re-positioning graphics of the UI with a mouse, defining control parameters, and providing configuration arguments.

22. The system of claim 16, wherein the default UI is represented as one or more interactive Graphical User Interfaces (GUIs).

23. A computer-implemented method for customizing a software installation of a portable communication device, comprising:
    receiving software;
    selecting components within the software to install on the portable communication device;
    graphically configuring the selected components on a presentation region representing the user interface of the portable communication device;
    previewing the configuration of the user interface of the portable communication device on the presentation region; and
    utilizing the configuration to produce a customized installation of the software on the portable communication device.

24. The method of claim 23, the software is associated with an update for at least one of an operating system, a program, an application, and firmware associated with a mobile communication device.

25. The method of claim 23, the software installation includes generation of a custom user interface (UI).

26. The method of claim 25, re-positioning at least one of a control, a button, a menu, an icon, and a menu item within the UI.

27. The method of claim 23, further comprising adding a proprietary or third party component to the custom installation.

28. The method of claim 27, the added component is a logo.

29. A computer-based system that includes a computer-readable storage medium having stored thereon computer-executable components for customizing the installation of a software update on one or more microprocessor-based devices, the system comprising:
    an input component to receive software updates associated with the device, wherein the input component receives at least one selected design component and at least one reference to a respective customized code via an API;
    a software installation manager to receive or retrieve the software updates from the input component;
    a configuration component that separates or groups the software updates into various groups of software components, the various groups of software components comprising a plurality of design components, wherein the configuration component configures the portable communication device to provide a functionality associated with the at least one selected design component and the respective customized code;
    a software installer interface facilitating interaction between the software installation manager and an installer associated with the software update, the software installation manager facilitates modifying current customization of software installed on the device through the software installer interface to enable the installer associated with the software update to select individual design components from the plurality of design components for installation on the device, the software installer interface further previews default software update configuration, remove design components from the plurality of design components of the software update, add design components from the plurality of design components to the software update, or re-layout design components from the plurality of design components of the software update; and
    an isolation component that masks design component information from one OEM to another upon selection of the design component.

* * * * *